US012496821B2

(12) United States Patent
Goi et al.

(10) Patent No.: US 12,496,821 B2
(45) Date of Patent: Dec. 16, 2025

(54) METHOD OF MANUFACTURING LIQUID EJECTING APPARATUS

(71) Applicant: SEIKO EPSON CORPORATION, Tokyo (JP)

(72) Inventors: Madoka Goi, Matsumoto (JP); Yuki Watanabe, Matsumoto (JP); Akinori Taniuchi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 166 days.

(21) Appl. No.: 18/606,275

(22) Filed: Mar. 15, 2024

(65) Prior Publication Data

US 2024/0308210 A1 Sep. 19, 2024

(30) Foreign Application Priority Data

Mar. 16, 2023 (JP) ................................ 2023-041681

(51) Int. Cl.
*B41J 2/045* (2006.01)
*B41J 2/145* (2006.01)

(52) U.S. Cl.
CPC ....... *B41J 2/04581* (2013.01); *B41J 2/04541* (2013.01); *B41J 2/04588* (2013.01); *B41J 2/145* (2013.01)

(58) Field of Classification Search
CPC ....... B41J 2/01; B41J 2/14; B41J 2/145; B41J 2/04588; B41J 2/0451; B41J 2/0456; B41J 2/04541
See application file for complete search history.

(56) References Cited

U.S. PATENT DOCUMENTS 11,878,517 B2 * 1/2024 Arakane .............. B41J 2/04595
2003/0048331 A1 3/2003 Takahashi et al.
2003/0234826 A1 12/2003 Hosono et al.

FOREIGN PATENT DOCUMENTS

JP 2003-011370 A 1/2003
JP 2003-326716 A 11/2003

* cited by examiner

*Primary Examiner* — Thinh H Nguyen

(74) *Attorney, Agent, or Firm* — Harness, Dickey & Pierce, P.L.C.

(57) ABSTRACT

A method of manufacturing a liquid ejecting apparatus including a liquid ejecting head that includes a number N of nozzle arrays that are two or more nozzle arrays includes selecting one ejection amount identification information piece from among the plurality of ejection amount identification information pieces according to a one grouping pattern in which the nozzle arrays are grouped so that the nozzle arrays corresponding to the drive element to which the drive signal generated by each of the one or more drive signal generating circuits is commonly supplied are grouped into the same group, and setting, based on the one ejection amount identification information piece, a number of times that the liquid is ejected from the number N of nozzle arrays onto the medium per unit area.

7 Claims, 17 Drawing Sheets

FIG. 7

| FIRST GROUPING PATTERN GPa | NOZZLE ARRAY | AMOUNT OF INK EJECTED WHEN SIGNAL HAVING INSPECTION WAVEFORM IS APPLIED [pl] | AVERAGE OF AMOUNTS OF INK EJECTED FROM GROUP [pl] | RELATIVE RATIO [%] | NOZZLE ARRAY COLOR ID |
|---|---|---|---|---|---|
| GROUP Ga1 | LA1 | 5.11 | 5.04 | 101.4 | 101 |
| | LA2 | 4.97 | | 98.6 | 99 |
| GROUP Ga2 | LB1 | 5.00 | 5.11 | 97.8 | 98 |
| | LB2 | 5.22 | | 102.2 | 102 |
| GROUP Ga3 | LC1 | 4.89 | 5.05 | 96.8 | 97 |
| | LC2 | 5.21 | | 103.2 | 103 |

90a

FIG. 8

| SECOND GROUPING PATTERN GPb | NOZZLE ARRAY | AMOUNT OF INK EJECTED WHEN SIGNAL HAVING INSPECTION WAVEFORM IS APPLIED [pl] | AVERAGE OF AMOUNTS OF INK EJECTED FROM GROUP [pl] | RELATIVE RATIO [%] | NOZZLE ARRAY COLOR ID |
|---|---|---|---|---|---|
| GROUP Gb1 | LA1 | 5.11 | 5.00 | 102.2 | 102 |
| | LB1 | 5.00 | | 100.0 | 100 |
| | LC1 | 4.89 | | 97.8 | 98 |
| GROUP Gb2 | LA2 | 4.97 | 5.13 | 96.8 | 97 |
| | LB2 | 5.22 | | 101.7 | 102 |
| | LC2 | 5.21 | | 101.5 | 102 |

90b

FIG. 9

| THIRD GROUPING PATTERN GPc | NOZZLE ARRAY | AMOUNT OF INK EJECTED WHEN SIGNAL HAVING INSPECTION WAVEFORM IS APPLIED [pl] | AVERAGE OF AMOUNTS OF INK EJECTED FROM GROUP [pl] | RELATIVE RATIO [%] | NOZZLE ARRAY COLOR ID |
| --- | --- | --- | --- | --- | --- |
| GROUP Gc1 | LA1 | 5.11 | 5.07 | 100.9 | 101 |
| | LA2 | 4.97 | | 98.1 | 98 |
| | LB1 | 5.00 | | 98.7 | 99 |
| | LB2 | 5.22 | | 103.0 | 103 |
| | LC1 | 4.89 | | 96.5 | 97 |
| | LC2 | 5.21 | | 102.8 | 103 |

90c

FIG. 10

| FIRST GROUPING PATTERN GPa | NOZZLE ARRAY | NOZZLE ARRAY COLOR ID | DRIVE SIGNAL | DUTY [%] |
|---|---|---|---|---|
| GROUP Ga1 | LA1 | 101 | Com−a1 | 99 |
| | LA2 | 99 | | 101 |
| GROUP Ga2 | LB1 | 98 | Com−a2 | 102 |
| | LB2 | 102 | | 98 |
| GROUP Ga3 | LC1 | 97 | Com−a3 | 103 |
| | LC2 | 103 | | 97 |

90a

FIG. 12

| SECOND GROUPING PATTERN GPb | NOZZLE ARRAY | NOZZLE ARRAY COLOR ID | DRIVE SIGNAL | DUTY [%] |
|---|---|---|---|---|
| GROUP Gb1 | LA1 | 102 | Com-b1 | 98 |
| | LB1 | 100 | | 100 |
| | LC1 | 98 | | 102 |
| GROUP Gb2 | LA2 | 97 | Com-b2 | 103 |
| | LB2 | 102 | | 98 |
| | LC2 | 102 | | 98 |

90b

FIG. 14

| THIRD GROUPING PATTERN GPc | NOZZLE ARRAY | NOZZLE ARRAY COLOR ID | DRIVE SIGNAL | DUTY [%] |
|---|---|---|---|---|
| GROUP Gc1 | LA1 | 101 | Com-c1 | 99 |
| | LA2 | 98 | | 102 |
| | LB1 | 99 | | 101 |
| | LB2 | 103 | | 97 |
| | LC1 | 97 | | 103 |
| | LC2 | 103 | | 97 |

90c

FIG. 19

| GROUPING PATTERN | GROUP 1 | GROUP 2 | GROUP 3 |
|---|---|---|---|
| GROUPING PATTERN **GP1** | L1,L2 | L3 | L4 |
| GROUPING PATTERN **GP2** | L1,L3 | L2 | L4 |
| GROUPING PATTERN **GP3** | L1,L4 | L2 | L3 |
| GROUPING PATTERN **GP4** | L2,L3 | L1 | L4 |
| GROUPING PATTERN **GP5** | L2,L4 | L1 | L3 |
| GROUPING PATTERN **GP6** | L3,L4 | L1 | L2 |
| GROUPING PATTERN **GP7** | L1,L2 | L3,L4 | |
| GROUPING PATTERN **GP8** | L1,L3 | L2,L4 | |
| GROUPING PATTERN **GP9** | L1,L4 | L2,L3 | |
| GROUPING PATTERN **GP10** | L1,L2,L3 | L4 | |
| GROUPING PATTERN **GP11** | L1,L2,L4 | L3 | |
| GROUPING PATTERN **GP12** | L1,L3,L4 | L2 | |
| GROUPING PATTERN **GP13** | L2,L3,L4 | L1 | |
| GROUPING PATTERN **GP14** | L1,L2,L3,L4 | | |

METHOD OF MANUFACTURING LIQUID EJECTING APPARATUS

The present application is based on, and claims priority from JP Application Serial Number 2023-041681, filed Mar. 16, 2023, the disclosure of which is hereby incorporated by reference herein in its entirety.

BACKGROUND

1. Technical Field

The present disclosure relates to a method of manufacturing a liquid ejecting apparatus.

2. Related Art

A liquid ejecting apparatus is widely used, which includes a liquid ejecting head having a plurality of nozzle arrays and a drive element for ejecting liquid such as ink from each of nozzles included in the plurality of nozzle arrays, and includes a drive signal generating circuit that generates a drive signal. Amounts of the liquid ejected from the nozzles included in the nozzle arrays may differ for each of the nozzle arrays. For example, JP-A-2003-011370 discloses a liquid ejecting apparatus that acquires identification information indicating relative ratios of amounts of liquid ejected from a plurality of nozzle arrays included in a liquid ejecting head and corrects, based on the identification information, a difference between amounts of liquid that is ejected from the nozzle arrays from which different amounts of liquid are ejected, and lands on a medium per unit area of the medium.

However, in the above-described existing technique, when the liquid ejecting head is embedded in the liquid ejecting apparatus, a pattern of grouping of the nozzle arrays corresponding to drive elements to which a drive signal generated by a drive signal generating circuit is commonly supplied needs to be identical to a pattern of grouping of the nozzle arrays corresponding to the identification information. When the two grouping patterns are different, there is a problem that it is not possible to correct a difference between amounts of liquid that is ejected from the nozzle arrays from which different amounts of liquid are ejected, and lands on a medium per unit area of the medium.

SUMMARY

To solve the above-described problem, according to an aspect of the present disclosure, a method of manufacturing a liquid ejecting apparatus including a liquid ejecting head that ejects liquid onto a medium and includes a number N of nozzle arrays that are two or more nozzle arrays and a drive element for ejecting the liquid from nozzles included in the number N of nozzle arrays, and including one or more drive signal generating circuits that generate a drive signal includes acquiring a plurality of ejection amount identification information pieces including a first ejection amount identification information piece indicating a relative ratio of an amount of the liquid ejected from each of the number N of nozzle arrays to an average amount of the liquid ejected from a group into which the nozzle array is grouped in a first grouping pattern in which the number N of nozzle arrays are grouped into a plurality of groups, and a second ejection amount identification information piece indicating a relative ratio of the amount of the liquid ejected from each of the number N of nozzle arrays to an average amount of the liquid ejected from a group into which the nozzle array is grouped in a second grouping pattern different from the first grouping pattern, selecting a one ejection amount identification information piece from among the plurality of ejection amount identification information pieces according to a one grouping pattern in which the nozzle arrays are grouped so that the nozzle arrays corresponding to the drive element to which the drive signal generated by each of the one or more drive signal generating circuits is commonly supplied are grouped into the same group, and setting, based on the one ejection amount identification information piece, a number of times that the liquid is ejected from the number N of nozzle arrays onto the medium per unit area.

BRIEF DESCRIPTION OF THE DRAWINGS

FIG. 7 is a diagram illustrating a specific example of a first grouping pattern.

FIG. 8 is a diagram illustrating a specific example of a second grouping pattern.

FIG. 9 is a diagram illustrating a specific example of a third grouping pattern.

FIG. 10 is a diagram illustrating an example of setting of duties when a first color ID is selected.

FIG. 12 is a diagram illustrating an example of setting of duties when a second color ID is selected.

FIG. 14 is a diagram illustrating an example of setting of duties when a third color ID is selected.

FIG. 19 is a diagram illustrating a list of color IDs for all grouping patterns of four nozzle arrays of the liquid ejecting head.

DESCRIPTION OF EMBODIMENTS

Embodiments of the present disclosure are described below with reference to the drawings. In each of the drawings, dimensions and scales of components are different from those of the actual components. In addition, since the embodiments described below are specific examples of the present disclosure, various technically preferable limitations are given. However, the scope of the present disclosure is not limited to the embodiments unless otherwise stated to limit the present disclosure in the following description.

1. First Embodiment

A manufacturing method according to a first embodiment is a method of manufacturing an ink jet printer 1 that is an example of a liquid ejecting apparatus. The ink jet printer 1 is described first, and the method of manufacturing the ink jet printer 1 is described next.

1-1. Overview of Ink Jet Printer 1

Figure 1:
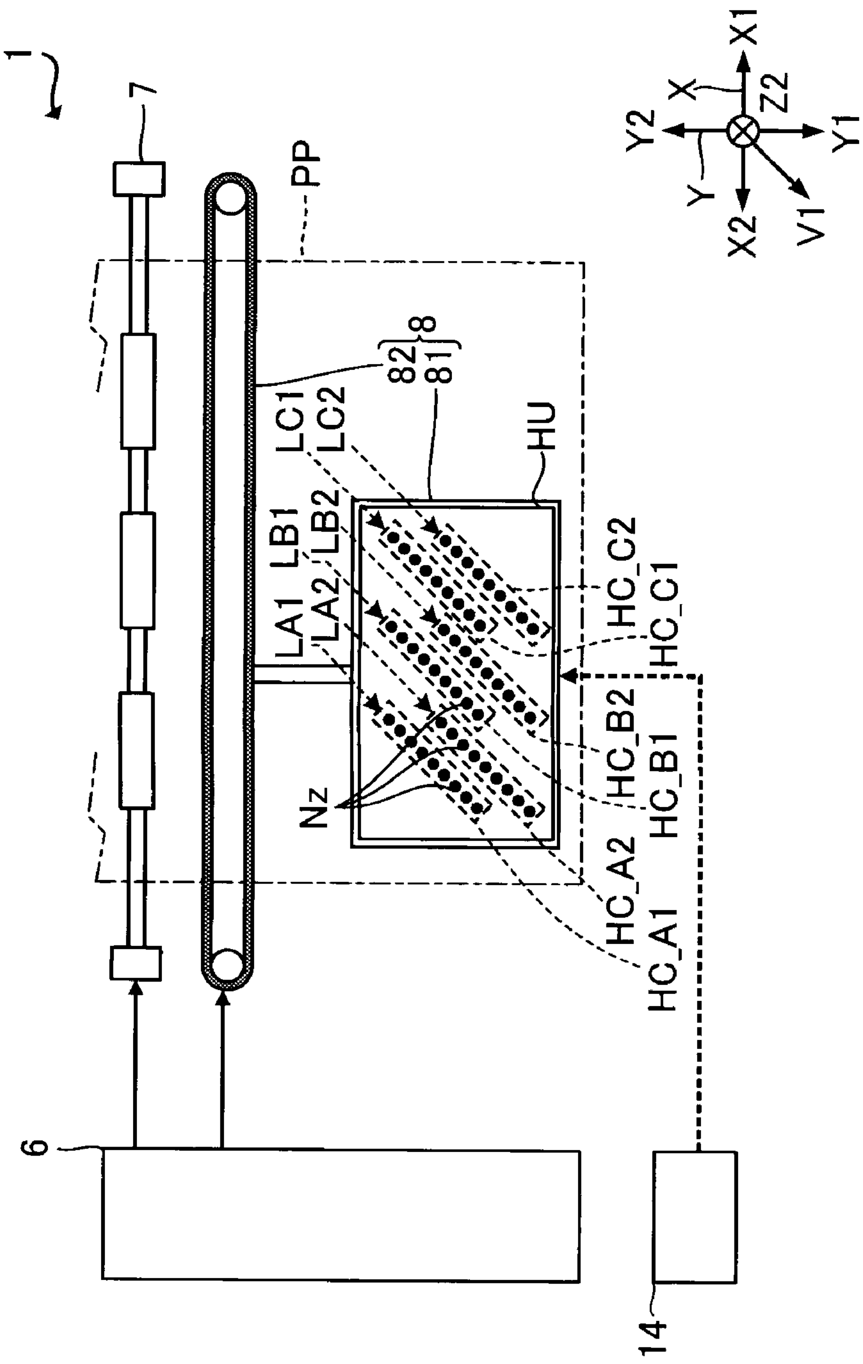
FIG. 1 is a schematic diagram exemplifying an ink jet printer according to a first embodiment.

FIG. 1 is a schematic diagram exemplifying the ink jet printer 1 according to the first embodiment. The ink jet printer 1 is an ink jet printing apparatus that ejects ink onto a medium PP. The ink is an example of liquid. The medium PP is typically a print sheet, but any print target such a resin film or fabric may be used as the medium PP.

As exemplified in FIG. 1, the ink jet printer 1 includes a controller 6, a liquid container 14, a moving mechanism 8, a transport mechanism 7, and a liquid ejecting head HU.

In the present embodiment, the ink jet printer 1 is an apparatus provided by a manufacturer of the ink jet printer 1. The manufacturer of the ink jet printer 1 is hereinafter also referred to as a "printer manufacturer". The liquid ejecting head HU is provided by a manufacturer of the liquid ejecting head HU. The manufacturer of the liquid ejecting head HU is a business operator that manufactures the liquid ejecting head HU. The manufacturer of the liquid ejecting head HU is hereinafter also referred to as a "head manufacturer". The printer manufacturer receives the liquid ejecting head HU provided from the head manufacturer and embeds the provided liquid ejecting head HU into the ink jet printer 1 to manufacture the ink jet printer 1. The printer manufacturer and the head manufacturer may be the same manufacturer.

The controller 6 is, for example, a processing circuit such as a CPU or an FPGA. CPU is an abbreviation for Central Processing Unit. FPGA is an abbreviation for Field Programmable Gate Array. The controller 6 controls each of components of the ink jet printer 1.

The liquid container 14 stores the ink to be supplied to the liquid ejecting head HU. As the liquid container 14, for example, a cartridge attachable to and detachable from the liquid ejecting head HU, a bag-shaped ink pack formed of a flexible film, an ink tank with which the ink can be filled, and the like can be used. For example, a plurality of types of ink of different colors are stored in the liquid container 14.

The moving mechanism 8 transports the medium PP in a Y1 direction along a Y axis under control by the controller 6. The Y1 direction and a Y2 direction opposite to the Y1 direction are hereinafter collectively referred to as a direction along the Y axis. In addition, an X1 direction along an X axis perpendicular to the Y axis and an X2 direction opposite to the X1 direction are hereinafter collectively referred to as a direction along the X axis. Furthermore, a Z1 direction along a Z axis perpendicular to the X axis and the Y axis and a Z2 direction opposite to the Z1 direction are hereinafter collectively referred to as a direction along the Z axis. The Z2 direction is a direction in which the ink is ejected.

The transport mechanism 7 causes the liquid ejecting head HU to reciprocate in the X1 direction and the X2 direction under control by the controller 6. As illustrated in FIG. 1, the transport mechanism 7 includes a storage case 81 storing the liquid ejecting head HU, and an endless belt 82 to which the storage case 81 is fixed. The liquid container 14 may be stored together with the liquid ejecting head HU in the storage case 81.

The liquid ejecting head HU ejects the ink onto the medium PP under control by the controller 6. In FIG. 1, the number of liquid ejecting heads HU included in the ink jet printer 1 is 1, but may be 2 or more.

The liquid ejecting head HU includes a plurality of head chips HC that eject the ink. In the example illustrated in FIG. 1, the liquid ejecting head HU includes six head chips HC, but the number of head chips HC included in the liquid ejecting head HU may not be six. The liquid ejecting head HU may include two or more head chips HC. In the example illustrated in FIG. 1, the liquid ejecting head HU includes, as the six chip heads HU, a head chip HC_A1, a head chip HC_A2, a head chip HC_B1, a head chip HC_B2, a head chip HC_C1, and a head chip HC_C2. The head chip HC_A1, the head chip HC_A2, the head chip HC_B1, the head chip HC_B2, the head chip HC_C1, and the head chip HC_C2 may be hereinafter referred to as head chips HC without being distinguished.

Each of the six head chips HC includes one or more nozzle arrays Ln. However, in the present embodiment, it is assumed that each of the head chips HC includes a single nozzle array Ln in order to simplify the following description. Each of the nozzle arrays Ln includes a plurality of nozzles Nz. As illustrated in FIG. 1, the head chip HC_A1 includes a nozzle array LA1. The head chip HC_A2 includes a nozzle array LA2. The head chip HC_B1 includes a nozzle array LB1. The head chip HC_B2 includes a nozzle array LB2. The head chip HC_C1 includes a nozzle array LC1. The head chip HC_C2 includes a nozzle array LC2. The nozzle array LA1, the nozzle array LA2, the nozzle array LB1, the nozzle array LB2, the nozzle array LC1, and the nozzle array LC2 may be hereinafter referred to as nozzle arrays Ln without being distinguished.

As illustrated in FIG. 1, each of the six head chips HC extends in a V1 direction that is parallel to an XY plane and intersects the X axis and the Y axis. Therefore, the six nozzle arrays Ln extend in the V1 direction. However, the direction in which the nozzle arrays Ln extend is not limited to the V1 direction and may be the direction along the Y axis.

Next, an example of a configuration of the ink jet printer 1 is described with reference to FIG. 2. However, the configuration of the ink jet printer 1 is not limited to an example illustrated in FIG. 2.

Figure 2:
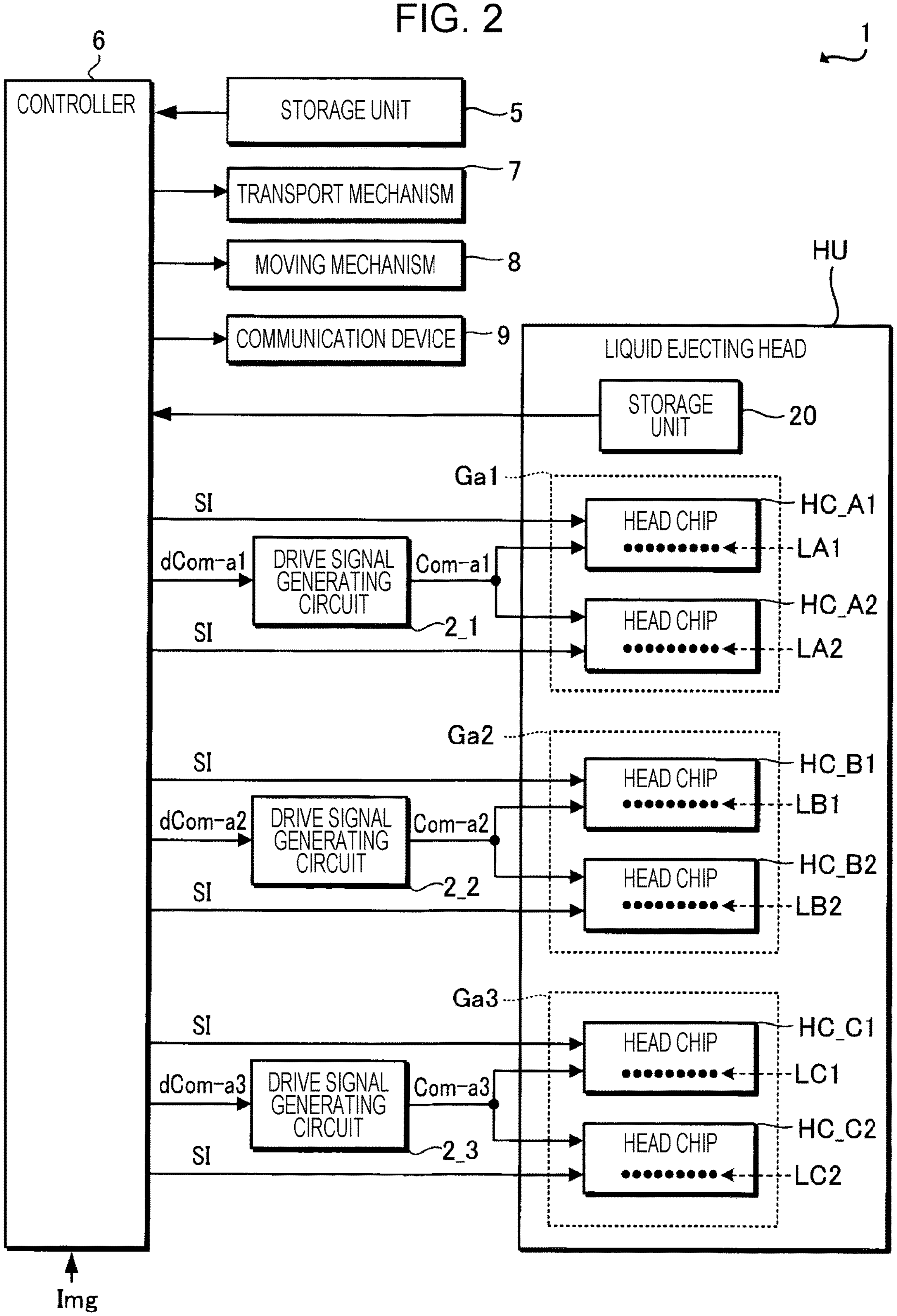
FIG. 2 is a functional block diagram illustrating an example of a configuration of the ink jet printer according to the first embodiment.

FIG. 2 is a functional block diagram illustrating the example of the configuration of the ink jet printer 1 according to the first embodiment. As illustrated in FIG. 2, the ink jet printer 1 includes a storage unit 5, a communication device 9, a drive signal generating circuit 2_1, a drive signal generating circuit 2_2, and a drive signal generating circuit 2_3, in addition to the configuration illustrated in FIG. 1. In the following description, the drive signal generating circuit 2_1, the drive signal generating circuit 2_2, and the drive signal generating circuit 2_3 may be hereinafter referred to as drive signal generating circuits 2 without being distinguished.

The communication device 9 is hardware including a communication circuit that communicates with another device. The communication device 9 is also referred to as a network device, a network controller, a network card, or a communication module.

The storage unit 5 includes a volatile memory such as a RAM and a nonvolatile memory such as a ROM, an EEPROM, or a PROM. The storage unit 5 stores print data Img supplied from a host computer and various types of information such as a control program of the ink jet printer 1. RAM is an abbreviation for Random-Access Memory. ROM is an abbreviation for Read-Only Memory. EEPROM is an abbreviation for Electrically Erasable Programmable Read-Only Memory. PROM is an abbreviation for Programmable ROM.

The controller 6 controls an ejection operation of the liquid ejecting head HU. Specifically, the controller 6 generates a print signal SI for controlling the six head chips HC included in the liquid ejecting head HU, a waveform specifying signal dCom for controlling the drive signal generating circuits 2, a signal for controlling the transport mechanism 7, and a signal for controlling the moving mechanism 8.

The waveform specifying signal dCom is a digital signal defining a waveform of a drive signal Com. The drive signal Com is an analog signal for driving piezoelectric elements PZ included in the head chips HC. The piezoelectric elements PZ are described later. Each of the drive signal generating circuits 2 includes a DA conversion circuit and generates a drive signal Com having a waveform defined by the waveform specifying signal dCom.

The print signal SI is a digital signal for specifying a type of operation of the piezoelectric elements PZ. Specifically, the print signal SI specifies the type of operation of the piezoelectric elements PZ by specifying whether the drive signals Com are to be supplied to the piezoelectric elements PZ. Specifying the type of operation of the piezoelectric elements PZ means, for example, specifying whether to drive the piezoelectric elements PZ, specifying whether the ink is to be ejected from the nozzles Nz when the piezoelectric elements PZ are driven, and specifying amounts of the ink to be ejected from the nozzles Nz Z when the piezoelectric elements PZ are driven.

The liquid ejecting head HU includes a storage unit 20 in addition to the six head chips HC. The storage unit 20 is a nonvolatile memory such as a ROM, an EEPROM, or a PROM. The storage unit 20 is an example of a "storage device". The head chips HC are described below with reference to FIGS. 3 and 4.

Figure 3:
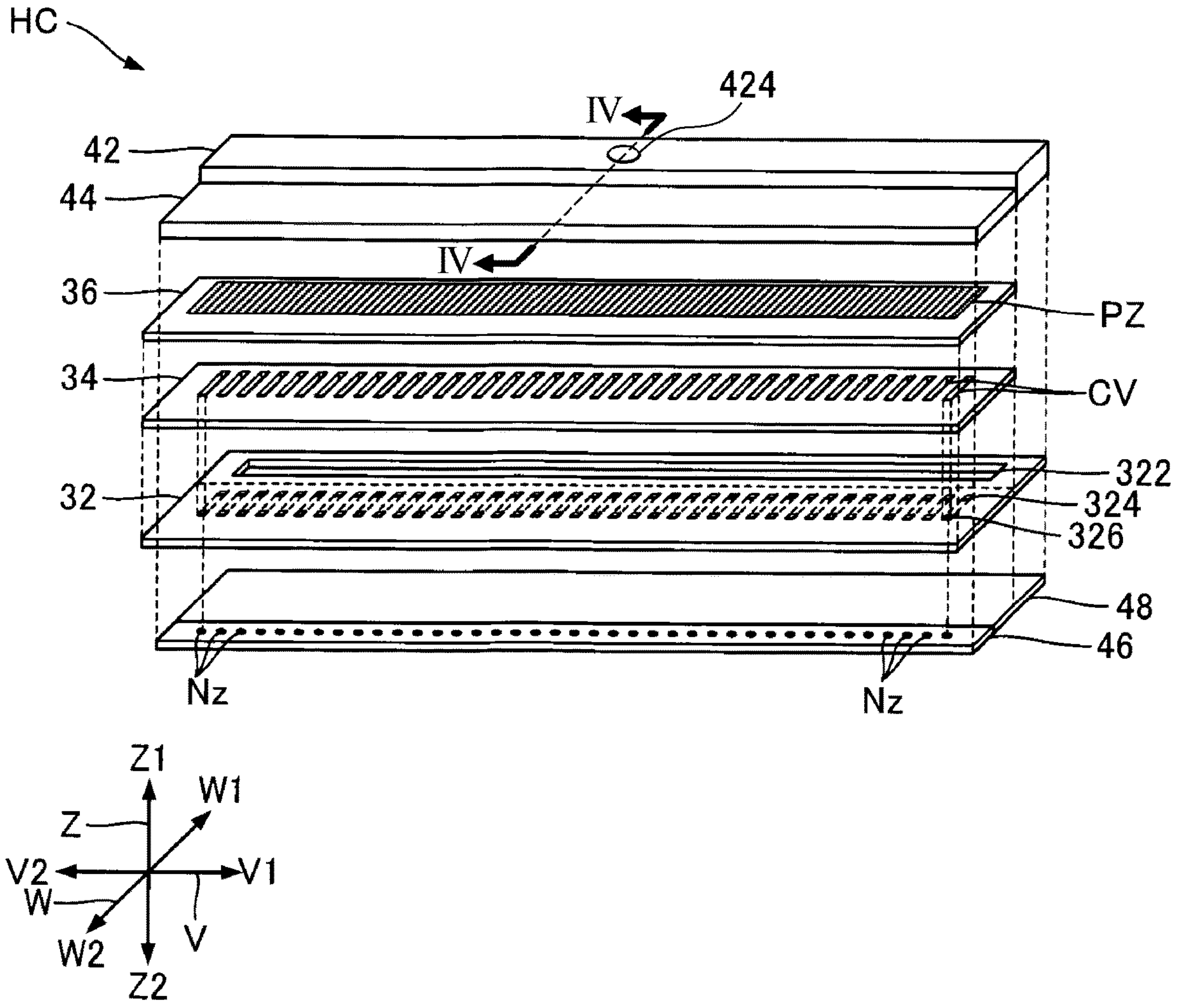
FIG. 3 is an exploded perspective view of a head chip.
Figure 4:
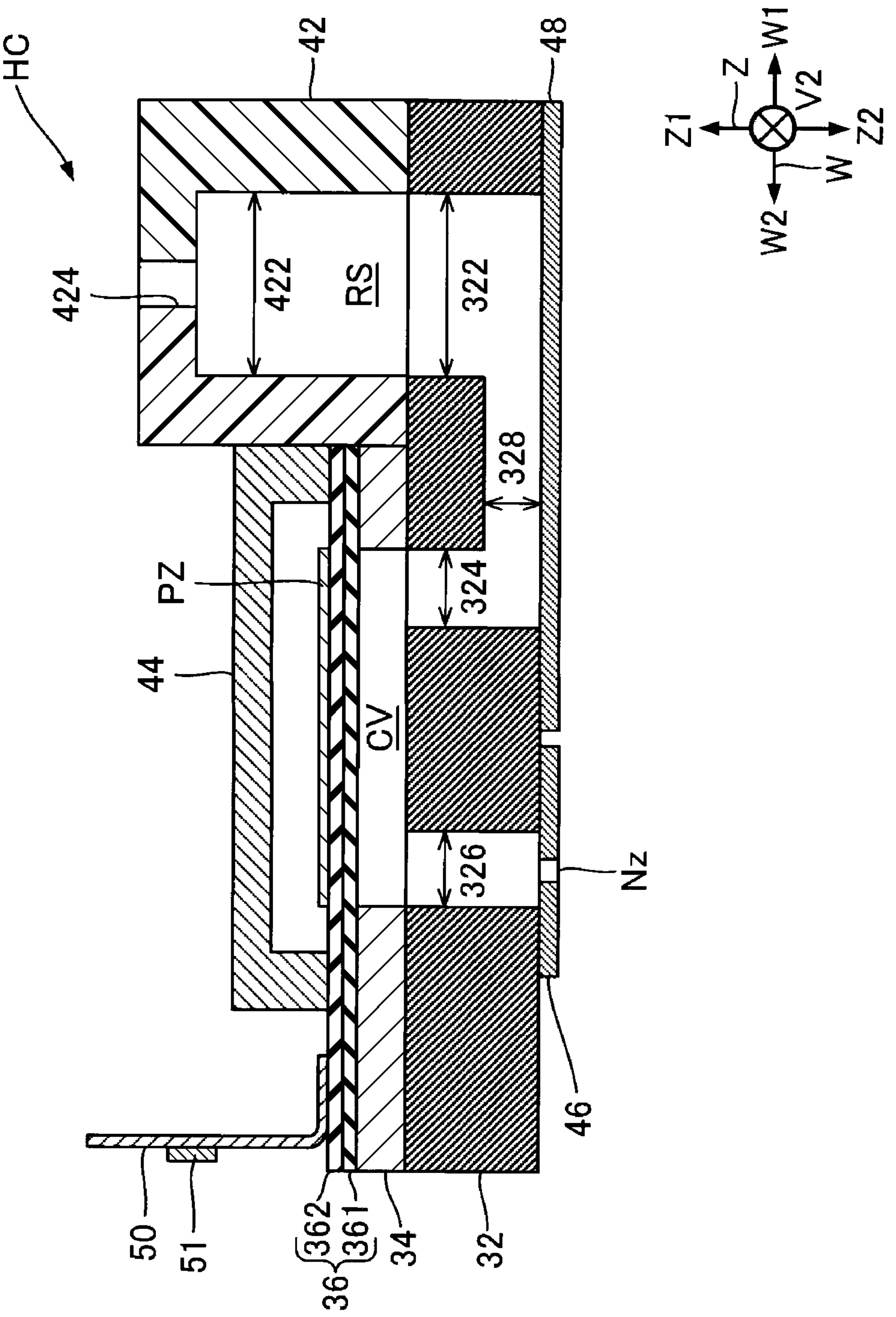
FIG. 4 is a cross-sectional view of the head chip.

With reference to FIGS. 3 and 4, a description is made using the V1 direction, a V2 direction opposite to the V1 direction, a W1 direction perpendicular to the direction along the Z axis and the V1 direction, and a W2 direction opposite to the W1 direction. The V1 direction and the V2 direction are hereinafter collectively referred to as a direction along a V axis. The W1 direction and the W2 direction are hereinafter collectively referred to as a direction along a W axis.

1-2. Overview of Head Chips HC

FIG. 3 is an exploded perspective view of the head chip HC. FIG. 4 is a cross-sectional view of the head chip HC. FIG. 4 illustrates a cross section of the head chip HC taken along IV-IV line illustrated in FIG. 3 and viewed in the V2 direction. The cross section taken along IV-IV line is parallel to a WZ plane, and IV-IV line passes through an inlet 424 described later.

As exemplified in FIGS. 3 and 4, the head chip HC includes a substantially rectangular communication plate 32 elongated along the V axis. A pressure chamber substrate 34, a vibration plate 36, the plurality of piezoelectric elements PZ, a housing 42, and a sealing body 44 are disposed on a surface of the communication plate 32 facing toward the Z1 direction. In other words, the communication plate 32 is stacked on a surface of the pressure chamber substrate 34 facing toward the Z2 direction. A nozzle substrate 46 and a compliance substrate 48 are disposed on a surface of the communication plate 32 facing toward the Z2 direction. The components of the head chip HC are substantially plate-shaped members substantially elongated along the V axis, like the communication plate 32, and are bonded to each other using an adhesive.

As exemplified in FIG. 3, the nozzle substrate 46 is a plate-shaped member in which the plurality of nozzles Nz arrayed along the V axis are formed. Each of the nozzles Nz is a through-hole through which the ink passes.

The communication plate 32 is a plate-shaped member in which a flow path through which the ink flows is disposed. As exemplified in FIGS. 3 and 4, an opening 322, second communication paths 324, and first communication paths 326 are formed in the communication plate 32. The opening 322 is a through-hole that is continuous over the plurality of nozzles Nz along the V axis in a plan view in the direction along the Z axis. Hereinafter, the plan view in the direction along the Z axis is merely referred to as a "plan view". Each of the second communication paths 324 and each of the first communication paths 326 are through-holes individually formed for each of the nozzles Nz. In addition, as exemplified in FIG. 4, a common flow path 328 that is continuous over the plurality of second communication paths 324 is formed in the surface of the communication plate 32 facing toward the Z2 direction. The common flow path 328 is a flow path via which the opening 322 communicates with the plurality of second communication paths 324.

Each of the communication plate 32 and the pressure chamber substrate 34 is formed by processing a silicon monocrystalline substrate by using a semiconductor manufacturing technique such as etching. However, a method of forming each of the components of the head chips HC is arbitrary.

The housing 42 is, for example, a structure formed by performing injection molding on a resin material and is fixed to the surface of the communication plate 32 facing toward the Z1 direction. As exemplified in FIG. 4, a storage portion 422 and the inlet 424 are formed in the housing 42. The storage portion 422 is a recess having an external shape corresponding to the opening 322 of the communication plate 32. The inlet 424 is a through-hole communicating with the storage portion 422. As is understood from the FIG. 4, a space via which the opening 322 of the communication plate 32 and the storage portion 422 of the housing 42 communicate with each other functions as a liquid storage chamber RS. The ink is supplied from the liquid container 14, passes through the inlet 424, and is stored in the liquid storage chamber RS.

The compliance substrate 48 has a function of buffering vibration of the ink in the liquid storage chamber RS. The compliance substrate 48 includes, for example, an elastically deformable and flexible sheet member. Specifically, the compliance substrate 48 is disposed on the surface of the communication plate 32 facing toward the Z2 direction to seal the opening 322, the common flow path 328, and the plurality of second communication paths 324 of the communication plate 32 and to form a bottom surface of the liquid storage chamber RS.

As exemplified in FIGS. 3 and 4, the pressure chamber substrate 34 is a plate-shaped member in which a plurality of pressure chambers CV corresponding to the plurality of respective nozzles Nz are formed. The plurality of pressure chambers CV are arrayed along the V axis and spaced apart from each other in the direction along the V axis. Each of the pressure chambers CV is an opening extending along the W axis. An end of each of the pressure chambers CV in the W1 direction overlaps a respective one of the second communication paths 324 in the plan view, and the other end of each of the pressure chambers CV in the W2 direction overlaps a respective one of the first communication paths 326 in the plan view.

The vibration plate 36 is disposed on a surface of the pressure chamber substrate 34 facing toward the opposite direction to the surface of the pressure chamber substrate 34 facing the communication plate 32. The vibration plate 36 is an elastically deformable plate-shaped member. As exemplified in FIG. 4, the vibration plate 36 is formed by stacking an elastic film 361 and an insulating film 362. The insulating film 362 is located in the opposite direction to the pressure chamber substrate 34 with respect to the elastic film 361. The elastic film 361 is made of, for example, silicon oxide. The insulating film 362 is made of, for example, zirconium oxide.

As is understood from FIG. 4, the communication plate 32 and the vibration plate 36 face each other at a distance on the inner side of each of the pressure chambers CV. The pressure chambers CV are located between the communication plate 32 and the vibration plate 36 and are spaces for applying pressure to the ink stored in the pressure chambers CV. The vibration plate 36 forms parts of wall surfaces of the pressure chambers CV. The ink stored in the liquid storage chamber RS flows from the common flow path 328 to each of the second communication paths 324 and is supplied to the plurality of pressure chambers CV in parallel and stored in the pressure chambers CV. That is, the liquid storage chamber RS functions as a common liquid chamber for supplying the ink to the plurality of pressure chambers CV.

As exemplified in FIGS. 3 and 4, the plurality of piezoelectric elements PZ corresponding to the plurality of respective nozzles Nz are disposed on a surface of the vibration plate 36 facing toward the opposite direction to the pressure chamber substrate 34. Each of the piezoelectric elements PZ is an actuator that deforms due to supply of a drive signal Com and is formed in a shape elongated along the W axis. The plurality of piezoelectric elements PZ are arrayed along the V axis so as to correspond to the plurality of pressure chambers CV. When the vibration plate 36 vibrates in coordination with the deformation of the piezoelectric elements PZ, the pressure in the pressure chambers CV changes. The piezoelectric elements PZ are drive elements that vibrate the vibration plate 36. The piezoelectric elements PZ are an example of a “drive element”.

Although not illustrated, each of the piezoelectric elements PZ includes a first electrode, a piezoelectric layer, and a second electrode that are stacked in the Z1 direction in this order. Either the first electrodes or the second electrodes are individual elements spaced apart from each other for each of the piezoelectric elements PZ, and a drive signal Com is supplied to each of the individual electrodes. The other electrodes that are not the individual electrodes and are the first electrodes or the second electrodes are a strip-shaped common electrode continuous over the plurality of piezoelectric elements PZ in the direction along the Y axis. An offset potential VBS is supplied to the other electrodes. The piezoelectric layers are formed of a crystal film having a perovskite structure and made of a ferroelectric ceramic material exhibiting an electromechanical conversion effect. That is, the piezoelectric layers are formed of so-called perovskite crystal. Specifically, as the material of the piezoelectric layers, for example, a ferroelectric piezoelectric material such as lead zirconate titanate, or a material obtained by adding metal oxide such as niobium oxide, nickel oxide, or magnesium oxide to a ferroelectric piezoelectric material such as lead zirconate titanate may be used. The piezoelectric layers can be formed by forming the above-described piezoelectric material by using a known film formation technique such as sputtering and burning the piezoelectric material at a high temperature by using a known processing technique such as photolithography. When the vibration plate 36 vibrates in coordination with the deformation of the piezoelectric elements PZ described above, the pressure in the pressure chambers CV changes and the ink is ejected from the nozzles Nz due to the changes in the pressure in the pressure chambers CV.

The sealing body 44 illustrated in FIGS. 3 and 4 is a structure that protects the plurality of piezoelectric elements PZ from outside air and reinforces the mechanical strength of the pressure chamber substrate 34 and the mechanical strength of the vibration plate 36. The sealing body 44 is fixed to the surface of the vibration plate 36 via, for example, an adhesive. The plurality of piezoelectric elements PZ are stored inside a recess formed in a surface of the sealing body 44 facing the vibration plate 36.

As exemplified in FIG. 4, a wiring substrate 50 is bonded to the surface of the vibration plate 36. The wiring substrate 50 is a mounting component on which a plurality of wirings for electrically coupling the controller 6 to the head chips HC are formed. For example, as the wiring substrate 50, a flexible wiring substrate such as an FPC or an FFC is suitably used. FPC is an abbreviation for Flexible Printed Circuit. FFC is an abbreviation for Flexible Flat Cable. A drive circuit 51 is mounted on the wiring substrate 50. The drive circuit 51 is an electric circuit that switches whether to supply the drive signals Com to the piezoelectric elements PZ under control by the print signal SI.

Return to FIG. 2. First, the controller 6 stores, to the storage unit 5, the print data Img supplied from the host computer. Next, the controller 6 generates, based on various data including the print data Img stored in the storage unit 5, various control signals including the print signal SI, the waveform specifying signal dCom, the signal for controlling the transport mechanism 7, and the signal for controlling the moving mechanism 8. Then, the controller 6 controls, based on the various control signals and the various data stored in the storage unit 5, the liquid ejecting head HU to drive the piezoelectric elements PZ while controlling the transport mechanism 7 and the moving mechanism 8 to change a relative position of the medium PP to the liquid ejecting head HU. Accordingly, the controller 6 controls whether to eject the ink from the nozzles Nz corresponding to the piezoelectric elements PZ, amounts of the ink to be ejected from the nozzles Nz, a timing of ejecting the ink, and the like and controls execution of a printing operation of forming an image corresponding to the print data Img on the medium PP.

In the example illustrated in FIG. 2, a drive signal Com-a1 generated by the drive signal generating circuit 2_1 based on a waveform specifying signal dCom-a1 output by the controller 6 is commonly supplied to the head chip HC_A1 and the head chip HC_A2. A drive signal Com-a2 generated by the drive signal generating circuit 2_2 based on a waveform specifying signal dCom-a2 output by the controller 6 is commonly supplied to the head chip HC_B1 and the head chip HC_B2. A drive signal Com-a3 generated by the drive signal generating circuit 2_3 based on a waveform specifying signal dCom-a3 output by the controller 6 is commonly supplied to the head chip HC_C1 and the head chip HC_C2.

As is understood from FIG. 2, the six nozzle arrays Ln can be regarded to be grouped into three groups, a group Ga1, a group Ga2, a group Ga3. The group Ga1 is formed by the nozzle array LA included in the head chip HC_A1 to which the drive signal Com-a1 is commonly supplied and the nozzle array LA2 included in the head chip HC_A2 to which the drive signal Com-a1 is commonly supplied. The group Ga2 is formed by the nozzle array LB1 included in the head chip HC_B1 to which the drive signal Com-a2 is commonly supplied and the nozzle array LB2 included in the head chip HC_B2 to which the drive signal Com-a2 is commonly supplied. The group Ga3 is formed by the nozzle array LC1 included in the head chip HC_C1 to which the drive signal Com-a3 is commonly supplied and the nozzle array LC2 included in the head chip HC_C2 to which the drive signal Com-a3 is commonly supplied.

However, the pattern of grouping of the nozzle arrays Ln corresponding to the head chips HC to which a drive signal Com is commonly supplied by a drive generating circuit 2 is not limited to the example illustrated in FIG. 2. For example, the number of drive signal generating circuits 2 included in the ink jet printer 1 may be 1. In this case, the single drive signal generating circuit 2 commonly supplies a drive signal Com to the head chips HC corresponding to the number N of nozzle arrays Ln included in the liquid ejecting head HU. Therefore, the number N of nozzle arrays Ln are grouped into a single group.

1-3. Regarding Difference Between Amounts of Ink to be Ejected from Nozzle Arrays Ln A certain amount of manufacturing error may occur in the plurality of head chips HC. Amounts of ink ejected by two head chips HC may be different due to the manufacturing error. For example, even when the same drive signal Com is applied to each of the two head chips HC, shapes of pressure chambers CV may be different, shapes of nozzles Nz may be different, and the like due to the manufacturing error, and as a result, amounts of the ink ejected from the nozzle arrays Ln included in the head chips HC may be different. When the different amounts of the ink are ejected on the medium PP, amounts of the ink that landed on the medium PP per unit area may be different and the density of the ink on an image formed on the medium PP may be uneven. The unit area is arbitrary. For example, the unit area is based on the resolution of an image or the like formed on the medium PP. For example, when the resolution is a dpi, the unit area is the area of a square with sides of $1/\alpha$ inches.

When different drive signals Com can be supplied to head chips HC having nozzle arrays Ln from which different amounts of the ink are ejected, amounts of the ink to be ejected from the nozzle arrays Ln can be adjusted by adjusting each of the drive signals Com to be supplied to the head chips HC that eject different amounts of the ink. However, when a common drive signal Com is supplied to head chips HC having nozzle arrays Ln from which different amounts of the ink are ejected, the drive signal Com cannot be adjusted for each of the head chips HC. To avoid this, a difference between amounts of the ink that lands on the medium PP per unit area can be corrected by setting a number of times that the ink is ejected in such a way that the set number of times that the ink is ejected offsets a difference between amounts of the ink to be ejected from nozzle arrays Ln from which the different amounts of the ink are ejected. For example, when the smaller an amount of ink to be ejected from a nozzle array Ln, the larger a number of times that the ink is ejected from the nozzle array Ln, in other words, the higher a duty at which the ink is ejected from the nozzle array Ln, it is possible to offset a difference between amounts of the ink to be ejected from the nozzle arrays Ln from which the different amounts of the ink are ejected.

1-4. Regarding Grouping of Number N of Nozzle Arrays Ln

When the head manufacturer manufactures the ink jet printer 1, the head manufacturer can identify a pattern of grouping of the number N of nozzle arrays Ln into a group to which a common drive signal Com is supplied. Therefore, when the head manufacturer manufactures the ink jet printer 1, as a first procedure, the head manufacturer measures amounts of the ink ejected from the number N of nozzle arrays Ln by commonly applying a drive signal Com having an inspection waveform to each of the number N of head chips HC included in the liquid ejecting head HU in inspection after the liquid ejecting head HU is manufactured. The inspection waveform may be arbitrary as long as the ink is ejected. However, it is preferable that the inspection waveform cause large amounts of the ink to be ejected in order to accurately measure the amounts of the ink ejected. As a second procedure, the head manufacturer generates, based on the amounts of the ink ejected from the number N of nozzle arrays Ln, a color ID indicating each of the amounts of the ink ejected from the nozzle arrays Ln belonging to the group to which the common drive signal Com is supplied. The color ID is an example of an "ejection amount identification information piece". For easy understanding, the color ID means a set of identification information pieces indicating the amounts of the ink ejected from the number N of nozzle arrays Ln. An identification information piece indicating an amount of the ink ejected from a single nozzle array Ln may be referred to as a "nozzle array color ID". As a third procedure, the head manufacturer sets, based on the color ID, a number of times that the ink is ejected in such a way that the set number of times that the ink is ejected offsets a difference between amounts of the ink to be ejected from the nozzle arrays Ln, thereby correcting a difference between amounts of the ink that is ejected from the N number of nozzle arrays Ln and lands on the medium PP per unit area.

However, in a business model in which the printer manufacturer that is different from the head manufacturer embeds the liquid ejecting head HU provided from the head manufacturer in the ink jet printer 1, the head manufacturer cannot identify a pattern of grouping of the nozzle arrays Ln included in the head chips HC to which a common drive signal Com is supplied. Therefore, a pattern of grouping of the nozzle arrays Ln included in the head chips HC to which a common drive signal Com is supplied may be different from a pattern of grouping of the nozzle arrays Ln based on a color ID provided by the head manufacturer. When the two grouping patterns are different, it is not possible to set a number of times that the ink is ejected in such a way that the set number of times that the ink is ejected offsets a difference between amounts of the ink to be ejected from the nozzle arrays Ln, and it is not possible to correct a difference between amounts of the ink that is ejected from the nozzle arrays Ln and lands on the medium PP per unit area. In addition, when the head manufacturer manufactures the ink jet printer 1, and a common liquid ejecting head HU is embedded in a plurality of types of ink jet printers in which nozzle arrays Ln are grouped in different grouping patterns, a one color ID cannot support the plurality of types of ink jet printers, and the above-described measurement of amounts of ink ejected in order to set a color ID for each of the ink jet printers of different types involves duplication of work and is not efficient.

In the present embodiment, the head manufacturer prepares a plurality of color IDs for a plurality of grouping patterns in which the number N of nozzle arrays Ln are grouped into one or more groups. The printer manufacturer selects, from among the plurality of color IDs for the plurality of respective grouping patterns in which the number N of nozzle arrays Ln are grouped into one or more groups, a one color ID according to a one pattern of grouping of the nozzle arrays Ln included in the head chips HC to which a common drive signal Com is supplied in the ink jet printer 1 to be manufactured. Next, the printer manufacturer sets, based on the selected color ID, a number of times that the ink is ejected in such a way that the set number of times that the ink is ejected offsets a difference between amounts of the ink to be ejected from the nozzle arrays Ln, and that amounts of the ink that is ejected from the number N of nozzle arrays Ln and lands on the medium PP per unit area are equal.

1-5. Method of Manufacturing Ink Jet Printer 1

The method of manufacturing the ink jet printer 1 is described below. A system SY used for manufacturing the ink jet printer 1 is described with reference to FIG. 5.

Figure 5:
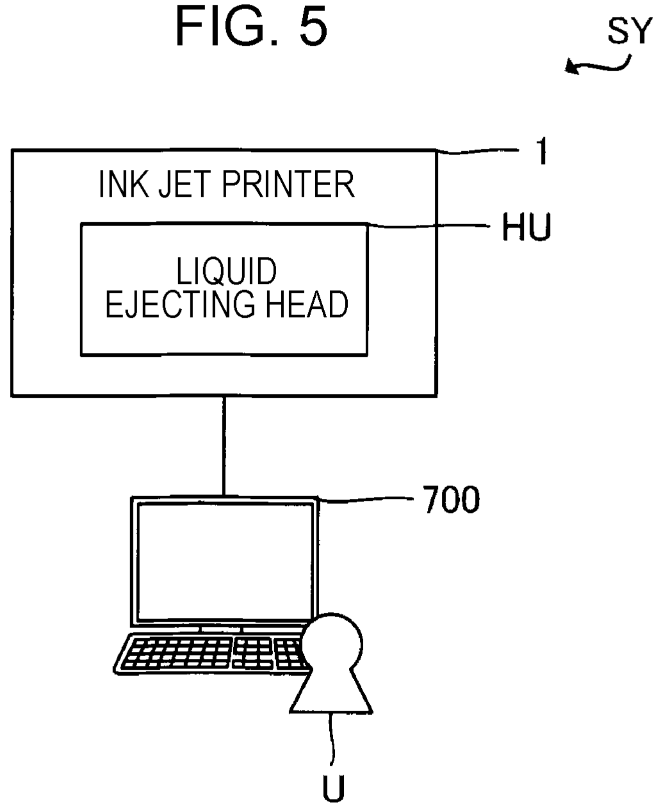
FIG. 5 is a diagram illustrating a configuration of a system.

FIG. 5 is a diagram illustrating a configuration of the system SY. The system SY is used for manufacturing the ink jet printer 1. The system SY includes the ink jet printer 1 having the liquid ejecting head HU embedded therein, and a computer 700 that sets a number of times that the ink is ejected from each of the nozzle arrays Ln. The computer 700 sets, according to an operation of a manufacturer U belonging to the printer manufacturer, a number of times that the ink is ejected from each of the number N of nozzle arrays Ln per unit area. The computer 700 is, for example, a desktop computer or a laptop computer.

The computer 700 includes a processing circuit such as a CPU or an FPGA, storage circuits such as a RAM and a ROM, a display device that displays an image, an input device that receives an operation of the manufacturer U, and a communication device that communicates with another device via a network NW. The display device is, for example, an organic EL display, an LED display, or an LCD. EL is an abbreviation for Electro-Luminescence. LED is an abbreviation for Light Emitting Diode. LCD is an abbreviation for Liquid Crystal Display. The input device includes, for example, a mouse and a keyboard. The computer 700 may have a configuration in which the input device is integrated with the display device. The configuration in which the input device is integrated with the display device is, for example, a touch panel.

However, when the ink jet printer 1 includes an input device and a display device, the system SY may not include the computer 700. In this case, the manufacturer U directly operates the ink jet printer 1.

Figure 6:
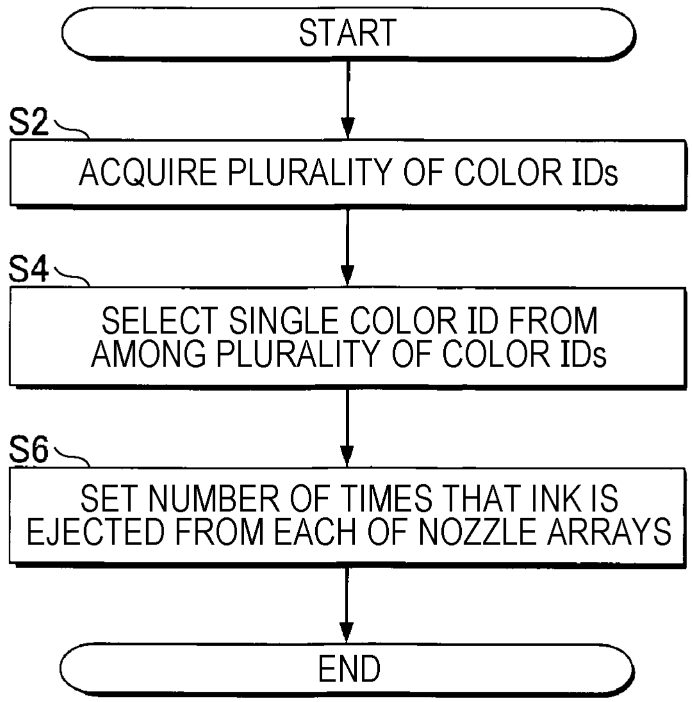
FIG. 6 is a flowchart illustrating steps of a method of manufacturing the ink jet printer.

FIG. 6 is a flowchart illustrating steps of the method of manufacturing the ink jet printer 1. In step S2, the computer 700 acquires the plurality of color IDs. In the first embodiment, the plurality of color IDs are stored by the head manufacturer in the storage unit 20 included in the liquid ejecting head HU. The computer 700 acquires the plurality of color IDs from the storage unit 20 included in the liquid ejecting head HU in the ink jet printer 1. Step S2 is an example of an example of "acquiring".

In the present embodiment, the head manufacturer prepares three types of color IDs for three grouping patterns, a first grouping pattern GPa, a second grouping pattern GPb, and a third grouping pattern GPC. Specific examples of the three types of grouping patterns are described with reference to FIGS. 7, 8, and 9.

FIG. 7 is a diagram illustrating a specific example of the first grouping pattern GPa. The first grouping pattern GPa includes a group Ga1, a group Ga2, and a group Ga3 and matches the grouping pattern illustrated in FIG. 2. In the following description, the group Ga1, the group Ga2, and the group Ga3 may be referred to as groups Ga without being distinguished. In the first grouping pattern GPa, six nozzle arrays Ln are grouped into the three groups Ga, and three is a divisor of six that is the number of nozzle arrays Ln. All of the numbers of nozzle arrays Ln belonging to the groups Ga are the same. Specifically, each of the groups Ga includes two of the nozzle arrays Ln. The first grouping pattern GPa is used, for example, when a type of ink to be ejected from the nozzle arrays Ln belonging to the group Ga1, a type of ink to be ejected from the nozzle arrays Ln belonging to the group Ga2, and a type of ink to be ejected from the nozzle arrays Ln belonging to the group Ga3 are different.

As illustrated in FIG. 7, the head manufacturer applies the drive signal Com having the inspection waveform to each of the head chips HC of the liquid ejecting head HU. When the drive signal Com having the inspection waveform is applied to each of the head chips HC, the amount of the ink ejected from the nozzle array LA1 is 5.11 [pl], the amount of the ink ejected from the nozzle array LA2 is 4.97 [pl], the amount of the ink ejected from the nozzle array LB1 is 5.00 [pl], the amount of the ink ejected from the nozzle array LB2 is 5.22 [pl], the amount of the ink ejected from the nozzle array LC1 is 4.89 [pl], and the amount of the ink ejected from the nozzle array LC2 is 5.21 [pl]. [pl] means picoliter.

As illustrated in FIG. 7, an average of the amounts of the ink ejected from the group Ga1 is approximately 5.04 [pl], an average of the amounts of the ink ejected from the group Ga2 is approximately 5.11 [pl], and an average of the amounts of the ink ejected from the group Ga3 is approximately 5.05 [pl].

The head manufacturer calculates, based on Equation (1), a relative ratio Rt of an amount of the ink ejected from each of the nozzle arrays Ln to an average of amounts of the ink ejected from a group Ga into which the nozzle array L is grouped among the groups Ga.

$$Rt = Iw\_Ln / \text{an average of amounts of the ink ejected from a group to which a nozzle array Ln belongs} \times 100 \quad (1)$$

In Equation (1), Iw_Ln is an amount of the ink ejected from the nozzle array Ln. As is understood from Equation (1), the relative ratio Rt is a ratio of the amount of the ink ejected from the nozzle array Ln to the average of the amounts of the ink ejected from the group Ga into which the nozzle array Ln is grouped. For example, a relative ratio Rt_aA1 of the amount of the ink ejected from the nozzle array LA1 included in the group Ga1 to an average of the amounts of the ink ejected from the nozzle arrays LA1 and LA2 included in the group Ga1 is calculated based on Equation (1) as follows.

$$Rt\_aA1 = 5.11/5.04 \times 100 = 101.4\ [\%]$$

Values obtained by rounding off the relative ratios Rt to the nearest whole numbers are determined as nozzle array color IDs. A color ID of the first grouping pattern GPa is a color ID 90*a* illustrated in FIG. 7.

FIG. 8 is a diagram illustrating a specific example of the second grouping pattern GPb. In the second grouping pattern GPb, the six nozzle arrays Ln are grouped into two groups, a group Gb1 and a group Gb2. In the following description, the group Gb1 and the group Gb2 may be referred to as groups Gb without being distinguished. In the second grouping pattern GPb, the six nozzle arrays Ln are grouped into the two groups Gb, each of which includes three of the nozzle arrays Ln. In the second grouping pattern GPb, the six nozzle arrays Ln are grouped into the two groups Gb, and two is a divisor of six that is the number of nozzle arrays Ln. All of the numbers of nozzle arrays Ln belonging to the groups Gb are the same. Specifically, each of the groups Gb includes three of the nozzle arrays Ln. More specifically, the group Gb1 includes the nozzle array LA1, the nozzle array LB1, and the nozzle array LC1. The group Gb2 includes the nozzle array LA2, the nozzle array LB2, and the nozzle array LC2. The second grouping pattern GPb is used, for example, when a type of ink to be ejected from the nozzle arrays Ln belonging to the group Gb1 and a type of ink to be ejected from the nozzle arrays Ln belonging to the group Gb2 are different.

Amounts of the ink ejected from the nozzle arrays Ln when the drive signal Com having the inspection waveform is applied to each of the head chips HC are equal to the amounts illustrated in FIG. 7. For the second grouping pattern GPb, a relative ratio Rt of an amount of the ink ejected from each of the nozzle arrays Ln to an average of amounts of the ink ejected from a group Gb into which the nozzle array Ln is grouped among the groups Gb is calculated in a similar manner to the calculation for the first grouping pattern GPa. For example, a relative ratio Rt_bA1 of the amount of the ink ejected from the nozzle array LA1 included in the group Gb1 to an average of the amounts of the ink ejected from the nozzle arrays LA1, LB1, and LC1 included in the group Gb1 is calculated based on Equation (1) as follows.

$$Rt\_bA1 = 5.11/5.00 \times 100 = 102.2[\%]$$

A color ID of the second grouping pattern GPb is a color ID 90*b* illustrated in FIG. 8.

FIG. 9 is a diagram illustrating a specific example of the third grouping pattern GPc. In the third grouping pattern GPc, all the six nozzle arrays Ln are grouped into a single group Gc1. The group Gc1 includes the six nozzle arrays Ln. The third grouping pattern GPc is used, for example, when a single type of ink is to be ejected from the nozzle arrays Ln included in the single liquid ejecting head HU.

Amounts of the ink that is ejected from the nozzle arrays Ln when the drive signal Com having the inspection waveform is applied to each of the head chips HC are equal to the amounts illustrated in FIG. 7. For the third grouping pattern GPc, a relative ratio Rt of an amount of the ink ejected from each of the nozzle arrays Ln to an average of amounts of the ink ejected from the nozzle arrays Ln included in the group Gc1 is calculated in a similar manner to the calculation for the first grouping pattern GPa. For example, a relative ratio Rt_cA1 of the amount of the ink ejected from the nozzle array LA1 included in the group Gc1 to the average of the amounts of the ink ejected from the nozzle arrays Ln included in the group Gc1 is calculated based on Equation (1).

$$Rt\_cA1 = 5.11/5.07 \times 100 = 100.9[\%]$$

A color ID of the third grouping pattern GPc is a color ID 90*c* illustrated in FIG. 9.

Any one of the first grouping pattern GPa and the second groping pattern GPb corresponds to a "first grouping pattern". A grouping pattern that is among the first grouping pattern GPa, the second grouping pattern GPb, and the third grouping pattern GPc and is not the grouping pattern corresponding to the "first grouping pattern" corresponds to a "second grouping pattern". For example, when the first grouping pattern GPa corresponds to the "first grouping pattern", any one of the second grouping pattern GPb and the third grouping pattern GPc corresponds to the "second grouping pattern", and 3 that is the number of groups of the first grouping pattern GPa corresponds to "M other than 1 and N among divisors of N". In addition, when the second grouping pattern GPb corresponds to the "first grouping pattern", any one of the first grouping pattern GPa and the third grouping pattern GPc corresponds to the "second grouping pattern", and 2 that is the number of groups of the second grouping pattern GPb corresponds to "M other than 1 and N among divisors of N".

Furthermore, a color ID of groups corresponding to the "first grouping pattern" corresponds to a "first ejection amount identification information piece", and a color ID of groups corresponding to the "second grouping pattern" corresponds to a "second ejection amount identification information piece".

Return to FIG. 6. After the end of the processing in step S2, the computer 700 selects, based on an operation of the manufacturer U, a one color ID for a group of the number N of nozzle arrays Ln in the ink jet printer 1 to be manufactured by the printer manufacturer in step S4. Step S4 is an example of "selecting".

A group of the nozzle arrays Ln in the ink jet printer 1 is a group in which the nozzle arrays Ln are grouped so that the nozzle arrays Ln corresponding to the head chips HC to which a drive signal Com is commonly supplied are grouped into the same group. Specifically, the computer 700 causes the display device included in the computer 700 to display an image indicating the color ID 90*a* illustrated in FIG. 7, the color ID 90*b* illustrated in FIG. 8, and the color ID 90*c* illustrated in FIG. 9. Next, the computer 700 selects a color ID matching the group of the nozzle arrays Ln in the ink jet printer 1 from among the plurality of color IDs based on an operation of the input device included in the computer 700 by the manufacturer U.

After the end of the processing in step S4, the computer 700 sets, based on the selected color ID, a number of times that the ink is ejected from the number N of nozzle arrays Ln onto the medium PP per unit area in step S6. Step S6 is an example of "setting".

In the present embodiment, the computer 700 sets values of duties of the nozzle arrays Ln as a number of times that the ink is ejected from the nozzle arrays Ln onto the medium PP per unit area. The computer 700 transmits the set values of the duties to the ink jet printer 1. The controller 6 of the ink jet printer 1 stores the values of the duties to the storage unit 5. To perform a printing operation, the ink jet printer 1 reads the values of the duties and ejects the ink at the read duties.

An example of setting of the duties when the color ID 90*a* is selected in step S4 is described with reference to FIGS. 10 and 11. An example of setting of the duties when the color ID 90*b* is selected in step S4 is described with reference to FIGS. 12 and 13. An example of setting of the duties when the color ID 90*c* is selected in step S4 is described with reference to FIGS. 14 and 15.

FIG. 10 is a diagram illustrating an example of the setting of the duties when the color ID 90*a* is selected. FIG. 11 is a diagram illustrating an aspect of supply of drive signals Com for the color ID 90*a*. As illustrated in FIG. 11, the ink jet printer 1 includes the drive signal generating circuit 2_1, the drive signal generating circuit 2_2, and the drive signal generating circuit 2_3. When the color ID 90*a* is selected, the drive signal generating circuit 2_1 outputs the drive signal Com-a1, the drive signal generating circuit 2_2 outputs the drive signal Com-a2, and the drive signal generating circuit 2_3 outputs the drive signal Com-a3. FIG. 11 illustrates a state of the liquid ejecting head HU viewed in the direction along the Z axis, and the head chips HC to which the three drive signal generating circuits 2 supply the drive signals Com, as an image that can identify the first grouping pattern GPa. As is understood from FIG. 11, in the first grouping pattern GPa, the six nozzle arrays Ln are grouped into groups Ga, each of which includes nozzle arrays Ln adjacent to each other along the Y axis.

Figure 11:
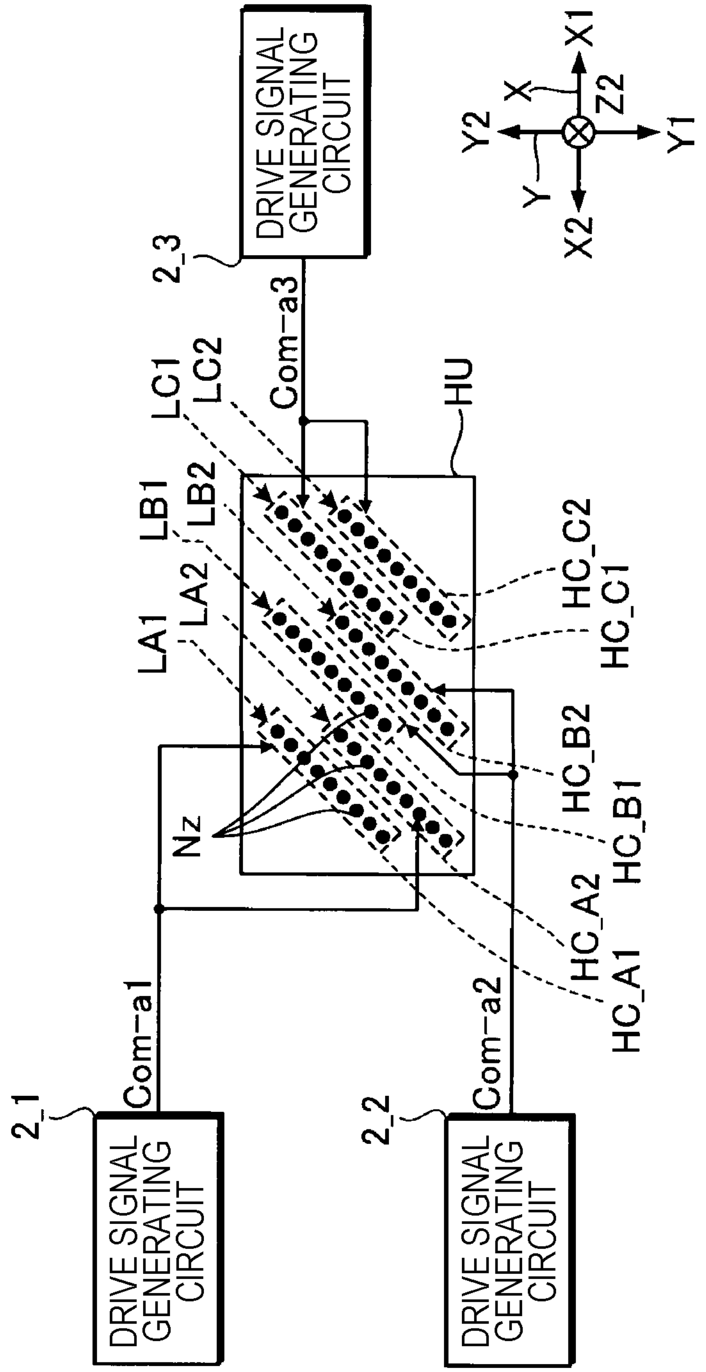
FIG. 11 is a diagram illustrating an aspect of supply of drive signals for the first color ID.

The ink jet printer 1 is manufactured in such a way that the drive signals Com are supplied to the six head chips HC when the color ID 90*a* is selected in the aspect illustrated in FIG. 11. Specifically, as illustrated in FIGS. 10 and 11, the ink jet printer 1 is manufactured in such a way that the drive signal Com-a1 is supplied to the head chips HC_A1 and HC_A2, the drive signal Com-a2 is supplied to the head chips HC_B1 and HC_B2, and the drive signal Com-a3 is supplied to the head chips HC_C1 and HC_C2.

The computer 700 sets the duties of the six nozzle arrays Ln to the duties illustrated in FIG. 10. As is understood from FIG. 10, a relative ratio of the amount of the ink ejected from the nozzle array LA1 included in the group Ga1 to an average of the amounts of the ink ejected from the nozzle arrays LA1 and LA2 included in the group Ga1 in the first grouping pattern GPa corresponding to the color ID 90*a* is 101 [%] and is higher than 99 [%] that is a relative ratio of the amount of the ink ejected from the nozzle array LA2 included in the group Ga1 to the average of the amounts of the ink ejected from the nozzle arrays LA1 and LA2 included in the group Ga1. Since a product of a relative ratio and a duty corresponds to an amount of ink that lands on the medium PP per unit area, the computer 700 sets the duty of the nozzle array LA1 to be lower than the duty of the nozzle array LA2. Specifically, the computer 700 sets, as each of the duties, a value obtained by adding 100 to a value obtained by subtracting the nozzle array color ID from 100. More specifically, the computer 700 sets the duty of the nozzle array LA1 to (100−101)+100=99 [%] and sets the duty of the nozzle array LA2 to (100−99)+100=101 [%]. In the above-described case, the group Ga1 corresponds to a "single group", the nozzle array LA1 corresponds to a "first nozzle array", and the nozzle array LA2 corresponds to a "second nozzle array".

Figure 13:
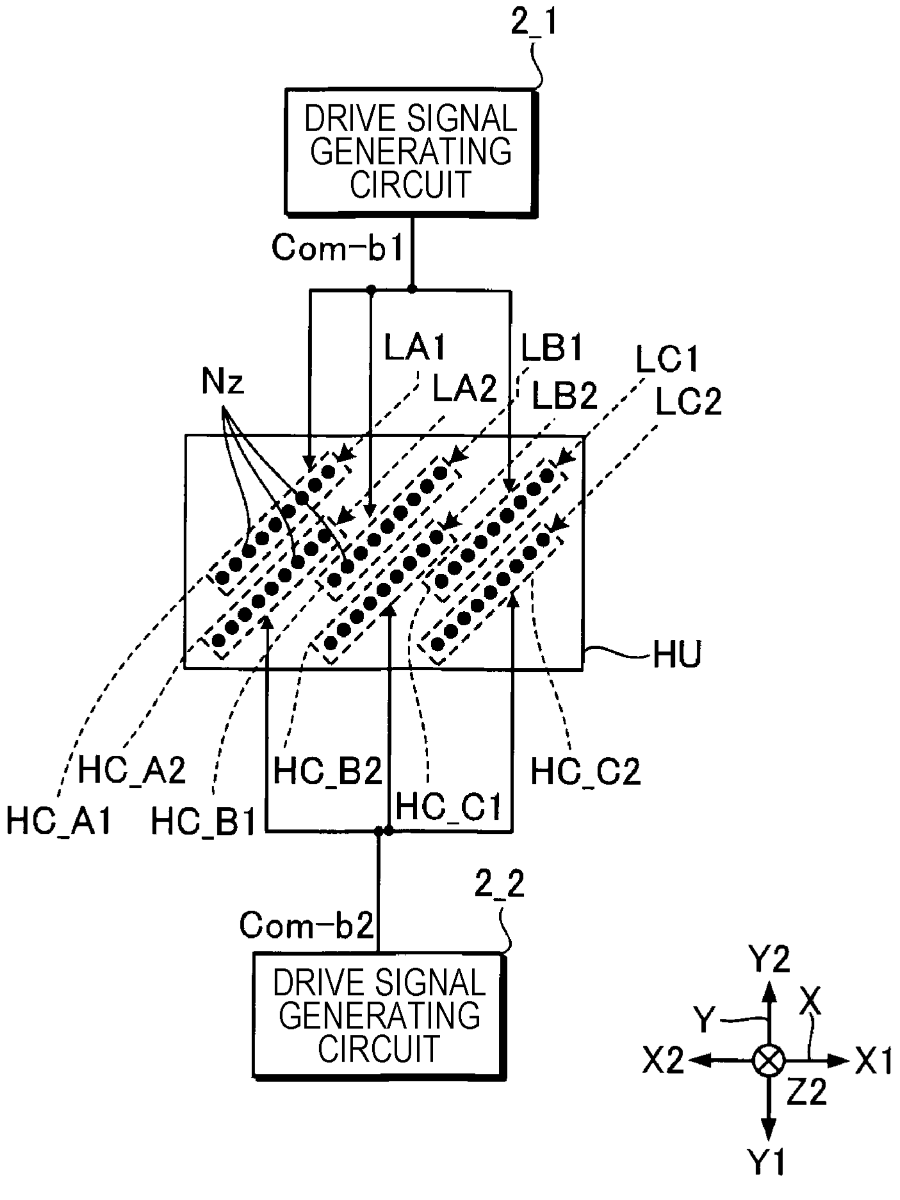
FIG. 13 is a diagram illustrating an aspect of supply of drive signals for the second color ID.

FIG. 12 is a diagram illustrating an example of the setting of the duties when the color ID 90*b* is selected. FIG. 13 is a diagram illustrating an aspect of supply of drive signals Com for the color IDs 90*b*. As illustrated in FIG. 13, the ink jet printer 1 includes the drive signal generating circuit 2_1 and the drive signal generating circuit 2_2. When the color ID 90*b* is selected, the drive signal generating circuit 2_1 outputs a drive signal Com-b1 and the drive signal generating circuit 2_2 outputs a drive signal Com-b2. FIG. 13 illustrates a state of the liquid ejecting head HU viewed in the direction along the Z axis, and the head chips HC to which the two drive signal generating circuits 2 supply the drive signals Com, as an image that can identify the second grouping pattern GPb. As is understood from FIG. 11, in the second grouping pattern GPb, the six nozzle arrays Ln are grouped into groups Gb, each of which includes three nozzle arrays Ln adjacent to each other along the X axis.

The ink jet printer 1 is manufactured in such a way that the drive signals Com are supplied to the six head chips HC when the color ID 90*b* is selected in the aspect illustrated n FIG. 13. Specifically, the ink jet printer 1 is manufactured in such a way that the drive signal Com-b1 is supplied to the head chips HC_A1, HC_B1, and HC_C1 and the drive signal Com-b2 is supplied to the head chips HC_A2, HC_B2, and HC_C2.

The computer 700 sets the duties of the six nozzle arrays Ln to the duties illustrated in FIG. 13. For example, the computer 700 sets the duty of the nozzle array LA1 to 98 [%], the duty of the nozzle array LB1 to 100 [%], and the duty of the nozzle array LC1 to 102 [%] for the group Gb1.

Figure 15:
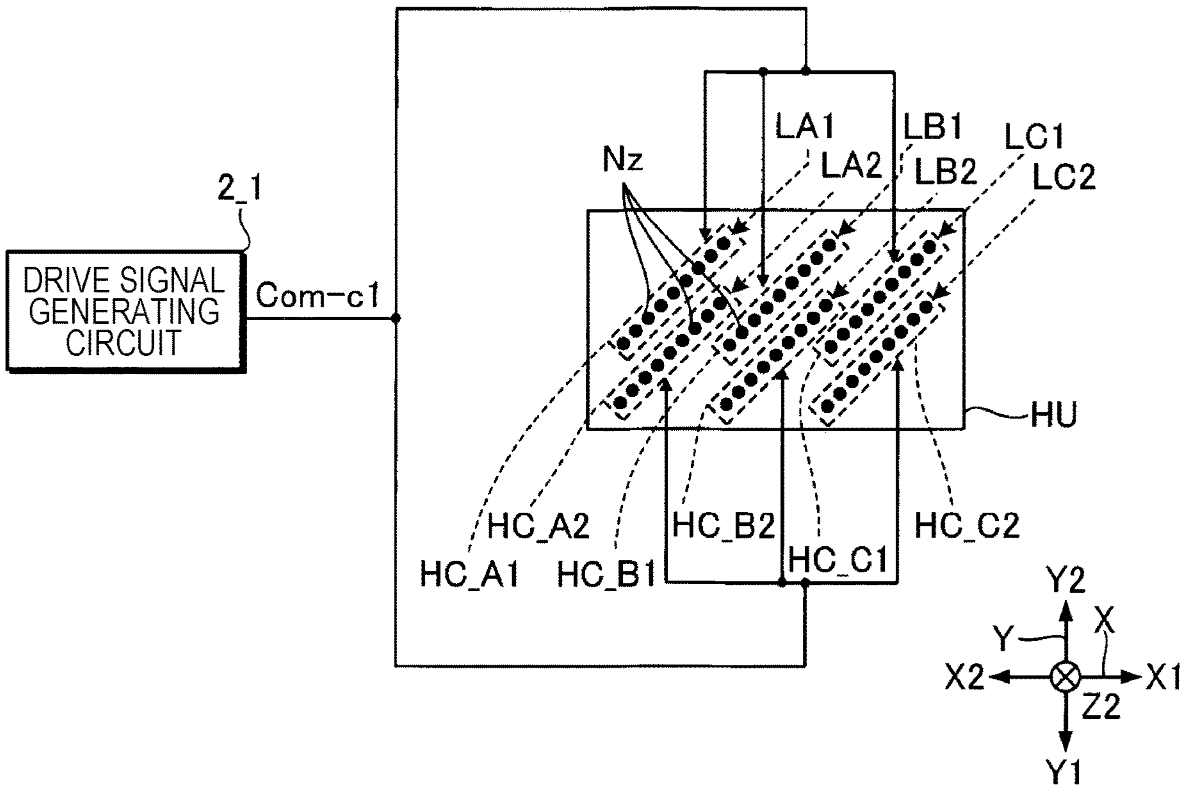
FIG. 15 is a diagram illustrating an aspect of supply of a drive signal for the third color ID.

FIG. 14 is a diagram illustrating an example of the setting of the duties when the color ID 90*c* is selected. FIG. 15 is a diagram illustrating an aspect of supply of a drive signal Com for the color ID 90*c*. As illustrated in FIG. 15, the ink jet printer 1 includes the drive signal generating circuit 2_1 that outputs a drive signal Com-c1 when the color ID 90*c* is selected. FIG. 15 illustrates a state of the liquid ejecting head HU viewed in the direction along the Z axis, and the head chips HC to which the single drive signal generating circuit 2 commonly supplies the drive signal Com, as an image that can identify the third grouping pattern GPc.

The ink jet printer 1 is manufactured in such a way that the drive signal Com is supplied to the six head chips HC when the color ID 90*c* is selected in the aspect illustrated in FIG. 15. Specifically, the ink jet printer 1 is manufactured in such a way that the drive signal Com-c1 is supplied to all of the six head chips HC.

The computer 700 sets the duties of the six nozzle arrays Ln to the duties illustrated in FIG. 14. Specifically, the computer 700 sets the duty of the nozzle array LA1 to 99 [%], the duty of the nozzle array LA2 to 102 [%], the duty of the nozzle array LB1 to 101 [%], the duty of the nozzle array LB2 to 97 [%], the duty of the nozzle array LC1 to 103 [%], and the duty of the nozzle array LC2 to 97 [%] for the group Gc1.

After the end of the processing in step S6, the computer 700 ends the series of processing illustrated in FIG. 6.

1-6. Summary of First Embodiment

A summary of the first embodiment is described using the first grouping pattern GPa and the third grouping pattern GPc. In the following description, the first grouping pattern GPa corresponds to the "first grouping pattern", and the third grouping pattern GPc corresponds to the "second grouping pattern". The color ID 90*a* is an example of the "first ejection amount identification information piece". The color ID 90*c* is an example of the "second ejection amount identification information piece".

The method of manufacturing the ink jet printer 1 according to the first embodiment is a method of manufacturing the ink jet printer 1 including the liquid ejecting head HU that ejects the ink onto the medium PP and includes the number N of nozzle arrays Ln and the piezoelectric elements PZ for ejecting the ink from each of the nozzles Nz included in the number N of nozzle arrays Ln, and including one or more drive signal generating circuits 2 that generate a drive signal Com. The method of manufacturing the ink jet printer 1 includes step S2, step S4, and step S6 described below. Step S2 is to acquire a plurality of color IDs including the color ID 90*a* indicating a relative ratio of an amount of the ink ejected from each of the number N of nozzle arrays Ln to an average of amounts of the ink ejected from a group Ga into which the nozzle array Ln is grouped in the first grouping pattern GPa in which the number N of nozzle arrays Ln are grouped into the three groups Ga, and the color ID 90*c* indicating a relative ratio of the amount of the ink ejected from each of the number N of nozzle arrays Ln to an average of amounts of the ink ejected from the group Gc1 in the third grouping pattern GPc different from the first grouping pattern GPa. Step S4 is to select, from among the plurality of color IDs, a one color ID according to a one grouping pattern in which the nozzle arrays Ln are grouped so that the nozzle arrays Ln corresponding to piezoelectric elements PZ to which a drive signal Com generated by each of the one or more drive signal generating circuits 2 is commonly supplied are grouped into the same group. Step S6 is to set, based on the one color ID, a number of times that the ink is ejected from the number N of nozzle arrays Ln onto the medium PP per unit area.

The manufacturer can select a color ID appropriate for the configuration of the ink jet printer 1 from among the plurality of color IDs. Alternatively, the manufacturer can manufacture the ink jet printer 1 having a desired configuration among the plurality of configurations corresponding to the plurality of color IDs.

When only a one color ID is present, only a single configuration in which a difference between amounts of ink that lands on the medium PP per unit area can be corrected is provided for the ink jet printer 1. However, since the plurality of color IDs are present, a configuration of the ink jet printer 1 can be selected from among the plurality of types of configurations in which a difference between amounts of ink that lands on the medium PP per unit area can be corrected, and the ink jet printer 1 can be highly freely designed.

The following description is made using the nozzle arrays LA1 and LA2 included in the group Ga1 in the first grouping pattern GPa corresponding to the color ID 90*a* selected in step S4. In this case, the group Ga1 corresponds to the "single group", the nozzle array LA1 corresponds to the "first nozzle array", and the nozzle array LA2 corresponds to the "second nozzle array". In step S6, when the relative ratio of the amount of the ink ejected from the nozzle array LA1 included in the group Ga1 among one or more groups in the first grouping pattern GPa corresponding to the color ID 90*a* to the average of the amounts of the ink ejected from the group Ga1 is higher than the relative ratio of the amount of the ink ejected from the nozzle array LA2 included in the group Ga1 to the average of the amounts of the ink ejected from the group Ga1, the duty of the nozzle array LA1 is set to be lower than the duty of the nozzle array LA2 based on the color ID 90*a* selected in step S4.

According to the manufacturing method according to the first embodiment, since a duty of a nozzle array Ln is set to be lower as a relative ratio of the amount of the ink ejected from the nozzle array Ln is higher, it is possible to reduce a difference between amounts of the ink that is ejected from the nozzle arrays Ln and lands on the medium PP per unit area.

The liquid ejecting head HU includes the storage unit 20 storing the plurality of color IDs. Step S2 is to acquire the plurality of color IDs from the storage unit 20.

According to the manufacturing method according to the first embodiment, the plurality of color IDs can be acquired from the storage unit 20 of the liquid ejecting head HU.

2. Second Embodiment

In the first embodiment, in step S2, the computer 700 acquires the plurality of color IDs from the storage unit 20 included in the liquid ejecting head HU in the ink jet printer 1. However, the plurality of color IDs may not be acquired from the storage unit 20. A second embodiment is described below.

Figure 16:
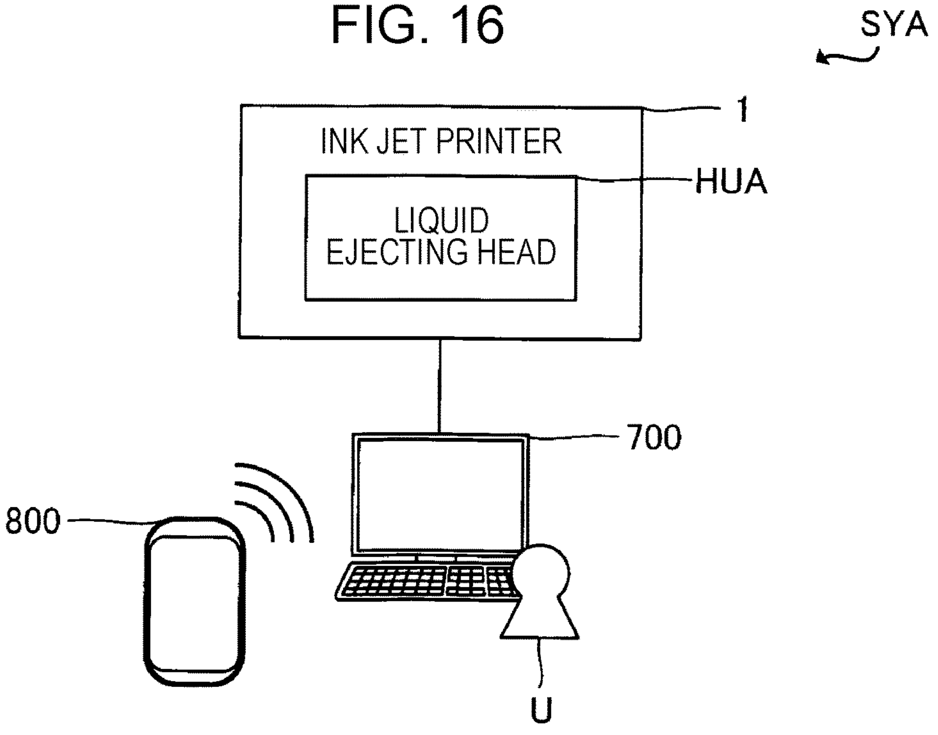
FIG. 16 is a diagram illustrating a configuration of a system according to a second embodiment.

FIG. 16 is a diagram illustrating a configuration of a system SYA according to the second embodiment. The system SYA is different from the system SY in that the system SYA includes a liquid ejecting head HUA instead of the liquid ejecting head HU and includes a mobile terminal 800. The mobile terminal 800 is a terminal that is operated by a manufacturer U.

The mobile terminal 800 includes a processing circuit such as a CPU or an FPGA, storage circuits such as a RAM and a ROM, a display device that displays an image, an input device that receives an operation of the manufacturer U, a communication device that communicates with a computer 700, and an imaging device that captures an image. The imaging device includes an imaging optical system and an imaging element. The imaging optical system is an optical system that includes at least one imaging lens and may include various optical elements such as a prism or may include a zoom lens, a focus lens, and the like. The imaging element is, for example, a CCD image sensor or a CMOS image sensor. CCD is an abbreviation for Charge Coupled Device. CMOS is an abbreviation for Complementary Metal Oxide Semiconductor.

The liquid ejecting head HUA is different from the liquid ejecting head HU in that an image indicating a plurality of color IDs is formed on a wall surface of the liquid ejecting head HUA. The image indicating the plurality of color IDs is a barcode or a two-dimensional code. The liquid ejecting head HUA may not include a storage unit 20.

In a method of manufacturing an ink jet printer 1 according to the second embodiment, in step S2, the computer 700 acquires, from the mobile terminal 800, imaging information indicating a captured image obtained by capturing the image indicating the plurality of color IDs by the imaging device of the mobile terminal 800. Then, the computer 700 acquires the plurality of color IDs by analyzing the imaging information.

In the manufacturing method according to the second embodiment, the imaging device of the mobile terminal 800 is used, the image indicating the plurality of color IDs is formed on the wall surface of the liquid ejecting head HUA, and the plurality of color IDs are acquired by analyzing the imaging information indicating the captured image obtained by capturing the image formed on the wall surface of the liquid ejecting head HUA by the imaging device in step S2.

According to the manufacturing method according to the second embodiment, the plurality of color IDs can be acquired and the liquid ejecting head HUA may not include a storage unit 20, as compared with the first embodiment.

3. Third Embodiment

The plurality of color IDs may not be acquired from the storage unit 20 and may not be acquired from the wall surface of the liquid ejecting head HUA. A third embodiment is described below.

Figure 17:
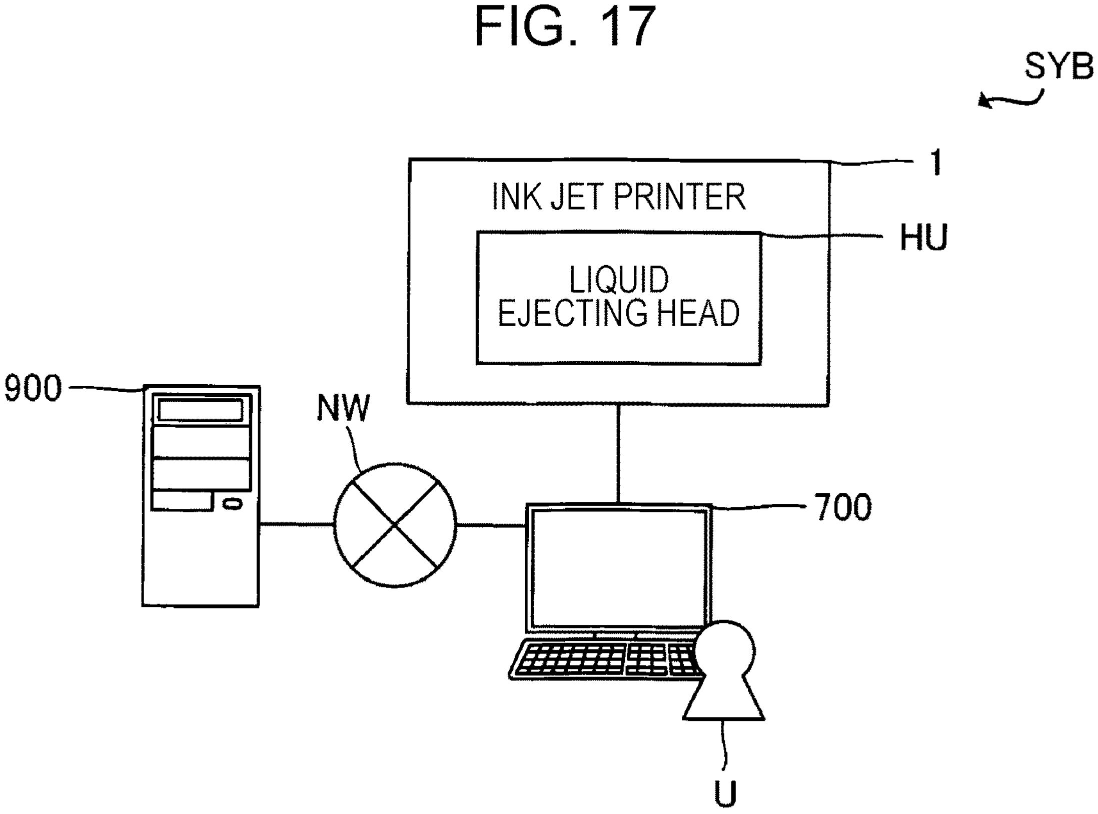
FIG. 17 is a diagram illustrating a configuration of a system according to a third embodiment.

FIG. 17 is a diagram illustrating a configuration of a system SYB according to the third embodiment. The system SYB is different from the system SY in that the system SYB includes a server 900. The server 900 is a computer managed by a head manufacturer.

The server 900 includes a processing circuit such as a CPU or an FPGA, storage circuits such as a RAM and a ROM, and a communication device that communicates with a computer 700 via a network NW such as a local area network (LAN) or the Internet. A plurality of color IDs are stored in either one or both of the storage circuits for each of serial numbers of liquid ejecting heads HU manufactured by the head manufacturer.

In a method of manufacturing an ink jet printer 1 according to the third embodiment, in step S2, the computer 700 transmits a serial number of a liquid ejecting head HU embedded in the ink jet printer 1. The serial number of the liquid ejecting head HU may be stored in a storage unit 20 included in the liquid ejecting head HU. Alternatively, an image indicating the serial number of the liquid ejecting head HU may be formed on a wall surface of the liquid ejecting head HU and the serial number of the liquid ejecting head HU may be input by a manufacturer U.

The server 900 transmits, to the computer 700, a plurality of color IDs corresponding to the serial number received from the computer 700. The computer 700 acquires the plurality of color IDs from the server 900.

In the manufacturing method according to the third embodiment, the server 900 that stores the plurality of color IDs is used and the computer 700 acquires the plurality of color IDs from the server 900 in step S2.

According to the manufacturing method according to the third embodiment, the plurality of color IDs can be acquired and an image indicating the plurality of color IDs may not be formed on a wall surface of the liquid ejecting head HU, as compared with the second embodiment.

4. Modifications

Each of the embodiments exemplified above can be variously modified. Specific aspects of modifications are exemplified below. Two or more aspects arbitrarily selected from the following examples can be combined to the extent that the aspects are not mutually inconsistent.

4-1. First Modification

In step S2 in each of the above-described aspects, the color IDs for all of the grouping patterns of the number N of nozzle arrays Ln may be acquired.

Figure 18:
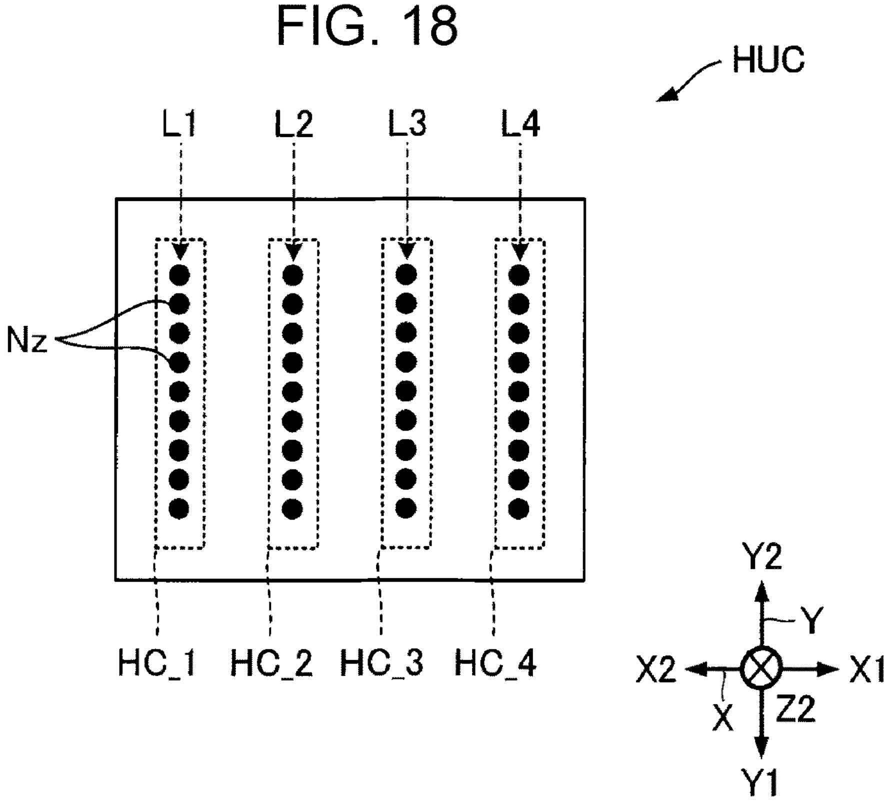
FIG. 18 is a diagram illustrating an aspect of a liquid ejecting head according to a first modification.

FIG. 18 is a diagram illustrating an aspect of a liquid ejecting head HUC according to a first modification. The liquid ejecting head HUC includes four head chips HC, a head chip HC_1, a head chip HC_2, a head chip HC_3, and a head chip HC_4. As illustrated in FIG. 18, the head chip HC_1 includes a nozzle array L1, the head chip HC_2 includes a nozzle array L2, the head chip HC_3 includes a nozzle array L3, and the head chip HC_4 includes a nozzle array L4. As illustrated in FIG. 18, the nozzle arrays L1, L2, L3, and L4 are arranged side by side along the X axis. In the first modification, the number N of nozzle arrays Ln included in the liquid ejecting head HUC is four.

FIG. 19 is a diagram illustrating a list of color IDs for all grouping patterns of the four nozzle arrays Ln of the liquid ejecting head HUC. As illustrated in FIG. 19, in the first modification, the grouping patterns are fourteen grouping patterns GP1 to GP14. In each of the six grouping patterns GP1 to GP6, the four nozzle arrays Ln are grouped into a single group of two nozzle arrays Ln and two groups, each of which includes a single nozzle array Ln. In each of the three grouping patterns GP7 to GP9, the four nozzle arrays Ln are grouped into two groups, each of which includes two nozzle arrays Ln. In each of the four grouping patterns GP10 to GP13, the four nozzle arrays Ln are grouped into a single group of three nozzle arrays Ln and a single group of one nozzle array Ln. In the grouping pattern GP14, the four nozzle arrays Ln are grouped into a single group.

In a method of manufacturing the ink jet printer 1 according to the first modification, the plurality of color IDs include a color ID indicating a relative ratio of an amount of the ink ejected from each of the number N of nozzle arrays Ln to an average amount of the ink ejected from a group into which the nozzle array Ln is grouped in each of all of the grouping patterns when the number N of nozzle arrays Ln are grouped into a group to which a drive signal Com is commonly supplied from each of one or more drive signal generating circuits 2.

According to the manufacturing method according to the first modification, a color ID to be selected by the manufacturer U can be included in the plurality of acquired color IDs.

4-2. Second Modification

In step S4 in each of the above-described aspects, an image indicating grouping patterns may be displayed in order for a manufacturer U to easily select a color ID.

Figure 20:
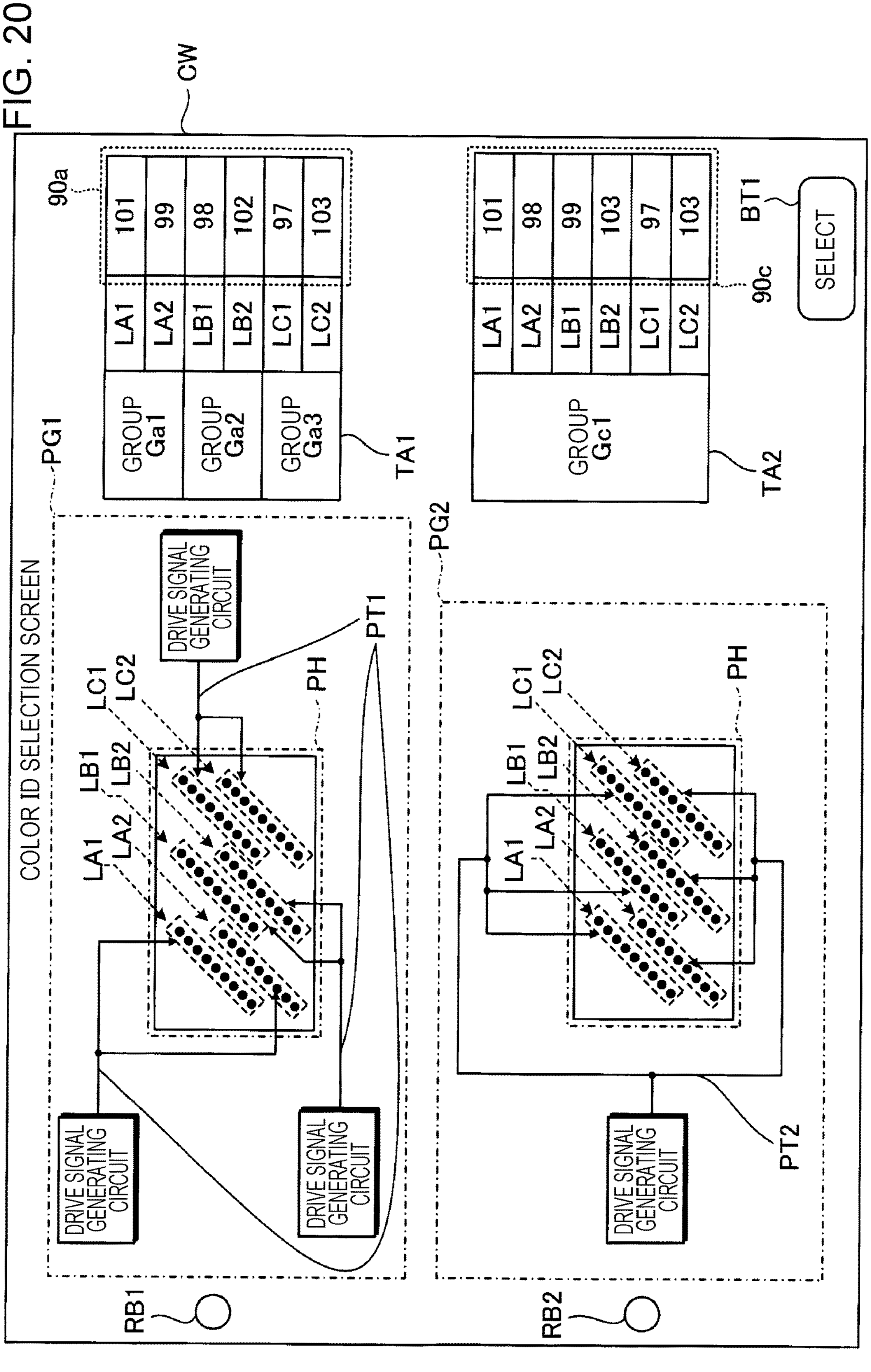
FIG. 20 is a diagram illustrating an example of a color ID selection screen.

FIG. 20 is a diagram illustrating an example of a color ID selection screen CW. To prevent the illustration from being complicated, FIG. 20 illustrates an aspect in which one of the color ID 90*a* and the color ID 90*c* is selected.

The color ID selection screen CW includes a radio button RB1, a grouping display image PG1, a color ID display image TA1, a radio button RB2, a grouping display image PG2, a color ID display image TA2, and a select button BT1.

The radio button RB1 is selected to select the color ID 90*a*. The radio button RB2 is selected to select the color ID 90*c*. When one of the radio button RB1 and the radio button RB2 is selected, the other of the radio button RB1 and the radio button RB2 is unselected.

The grouping display image PG1 is an image in which an image PT1 indicating the plurality of groups Ga in the first grouping pattern GPa is superimposed on a head image PH relating to an image of the liquid ejecting head HU viewed along the Z axis. The head image PH may be an image of the liquid ejecting head HU viewed along the Z axis or may be an image indicating the contour of the liquid ejecting head HU viewed along the Z axis. As illustrated in FIG. 20, the image PT1 indicates a correspondence relationship between the drive signal generating circuits 2 and the nozzle arrays Ln in the first grouping pattern GPa. The image PT1 may be an image in which the nozzle arrays Ln included in the same group Ga are surrounded by a frame, in addition to the aspect illustrated in FIG. 20. The color ID display image TA1 includes an image indicating the color ID 90*a*.

The grouping display image PG2 is an image in which an image PT2 indicating the group Gc1 in the third grouping pattern GPc is superimposed on the head image PH. As illustrated in FIG. 20, the image PT2 is an image indicating a corresponding relationship between the drive signal generating circuits 2 and the nozzle arrays Ln in the third grouping pattern GPc. The image PT2 may be an image in which the nozzle arrays Ln included in the group Gc1 is surrounded by a frame, in addition to the aspect illustrated in FIG. 20. The color ID display image TA2 includes an image indicating the color ID 90*c*.

The grouping display image PG1 corresponds to a "first image". The grouping display image PG2 corresponds to a "second image".

In step S2, the computer 700 acquires image information indicating the grouping display image PG1 and image information indicating the grouping display image PG2 together with the plurality of color IDs. In step S4, the computer 700 causes the display device to display the grouping display image PG1 and the grouping display image PG2 based on the two types of image information. The image information indicating the grouping display image PG1 corresponds to "first image information". The image information indicating the grouping display image PG2 corresponds to "second image information".

For example, when the select button BT1 is selected, the computer 700 causes the display device to display duties of the nozzle arrays Ln corresponding to a selected color ID.

In a method of manufacturing the ink jet printer 1 according to the second modification, the display device that displays an image is used, step S2 is to further acquire the image information indicating the grouping display image PG1 and the image information indicating the grouping display image PG2, and step S4 is to select a one color ID from among the plurality of color IDs after causing the display device to display the grouping display image PG1 and the grouping display image PG2.

According to the manufacturing method according to the second modification, since the manufacturer U can select a color ID while viewing the grouping display image PG1 and the grouping display image PG2, the manufacturer U can intuitively select the color ID and it is possible to reduce a possibility of selecting an inappropriate color ID that is not to be selected by the manufacturer U.

4-3. Third Modification

In each of the aspects described above, the liquid ejecting head HU includes the piezoelectric elements PZ, but may include heating elements instead of the piezoelectric elements PZ. The heating elements generate air bubbles in the pressure chambers CV by heating the ink in the pressure chambers CV. In the third modification, the heating elements are an example of the "drive element".

4-4. Fourth Modification

In each of the aspects described above, the method of manufacturing the ink jet printer 1 in which the transport mechanism 7 causes the liquid ejecting head HU to reciprocate in the direction along the X axis is exemplified. However, the present disclosure is not limited to the aspects. In each of the aspects described above, the ink jet printer 1 may be a line-type liquid ejecting apparatus in which a plurality of nozzles Nz are distributed over the entire width of the medium PP.

4-5. Fifth Modification

In each of the embodiments described above, the shapes of waveforms of the drive signals Com defined by the waveform specifying signals dCom supplied to the drive signal generating circuits 2 are identical. Therefore, a common signal can be used as each of the waveform specifying signals dCom that are digital signals, and it is possible to reduce the number of steps of designing the waveforms. Therefore, for example, the color ID 90*c* can be selected even when the ink jet printer 1 includes the same number of drive signal generating circuits 2 as the number of nozzle arrays Ln included in the head chips HC, that is, even when the ink jet printer 1 includes the six drive signal generating circuits 2 and the six nozzle arrays Ln in the head chips HC.

4-6. Six Modification

In the first embodiment described above, the three types of color IDs for the three types of grouping patterns that are the first grouping pattern GPa, the second grouping pattern GPb, and the third grouping pattern GPc are prepared. However, the color IDs are not limited thereto. Two types of color IDs for two types of grouping patterns may be prepared, or four or more types of color IDs for four or more types of grouping patterns may be prepared.

When attention is paid to one of the nozzle arrays Ln included in the liquid ejecting head HU, a combination of nozzle arrays Ln belonging to the same group in a certain one grouping pattern among a plurality of grouping patterns is different from a combination of nozzle arrays Ln belonging to the same group in a grouping pattern that is among the plurality of grouping patterns and is different from the certain one grouping pattern.

4-7. Other Modifications

Each of the ink jet printers 1 described above can be used for various apparatuses such as an apparatus dedicated to printing, a facsimile apparatus, and a copying machine. The use of the liquid ejecting apparatus according to the present disclosure is not limited to printing. The liquid ejecting apparatus may be a recording apparatus that ejects a solution of a colorant and is used as a manufacturing apparatus that forms a color filter for a liquid crystal display device. In addition, the liquid ejecting apparatus may be a recording device that ejects a solution of a conductive material and is used as a manufacturing apparatus that forms a wiring and an electrode of a wiring substrate.

5. Supplementary Notes

From the embodiments exemplified above, the following configurations are understood, for example.

According to a first aspect, a method of manufacturing a liquid ejecting apparatus including a liquid ejecting head that ejects liquid onto a medium and includes a number N of nozzle arrays that are two or more nozzle arrays and a drive element for ejecting the liquid from nozzles included in the number N of nozzle arrays, and including one or more drive signal generating circuits that generate a drive signal includes acquiring a plurality of ejection amount identification information pieces including a first ejection amount identification information piece indicating a relative ratio of an amount of the liquid ejected from each of the number N of nozzle arrays to an average amount of the liquid ejected from a group into which the nozzle array is grouped in a first grouping pattern in which the number N of nozzle arrays are grouped into a plurality of groups, and a second ejection amount identification information piece indicating a relative ratio of the amount of the liquid ejected from each of the number N of nozzle arrays to an average amount of the liquid ejected from a group into which the nozzle array is grouped in a second grouping pattern different from the first grouping pattern, selecting a one ejection amount identification information piece from among the plurality of ejection amount identification information pieces according to a one grouping pattern in which the nozzle array are grouped so that the nozzle arrays corresponding to the drive element to which the drive signal generated by each of the one or more drive signal generating circuits is commonly supplied are grouped into the same group, and setting, based on the one ejection amount identification information piece, a number of times that the liquid is ejected from the number N of nozzle arrays onto the medium per unit area.

In the first aspect, a probability that an ejection amount identification piece matching a grouping pattern in the liquid ejecting apparatus is included in the plurality of ejection amount identification information pieces acquired in the acquiring is higher than that in an aspect in which a one ejection amount identification information piece is acquired. Therefore, according to the manufacturing method according to the first embodiment, it is possible to increase a probability that a difference between amounts of the liquid that lands on the medium per unit area can be reduced.

According to a second aspect that is a specific example of the first aspect, the plurality of ejection amount identification information pieces include an ejection amount identification information piece indicating a relative ratio of the amount of the liquid ejected from each of the number N of nozzle arrays to an average amount of the liquid ejected from a group into which the nozzle array is grouped in each of all grouping patterns in which the number N of nozzle arrays are grouped into a group to which a drive signal generated by each of the one or more drive signal generating circuits is commonly supplied.

According to the second aspect, an ejection amount identification information piece matching the grouping pattern in the liquid ejecting apparatus can be included in the plurality of acquired ejection amount identification information pieces.

In a third aspect that is a specific example of the first aspect, when a relative ratio of an amount of the liquid ejected from a first nozzle array included in a single group among one or more groups to an average amount of the liquid ejected from the single group is higher than a relative ratio of an amount of the liquid ejected from a second nozzle array included in the single group to the average amount of the liquid ejected from the single group in a grouping pattern corresponding to the single ejection amount identification information piece, the setting sets, based on the single ejection amount identification information piece, a number of times that the liquid is ejected from the first nozzle array onto the medium per unit area is so as to be smaller than a number of times that the liquid is ejected from the second nozzle array onto the medium per unit area.

According to the third aspect, the higher a relative ratio of an amount of the liquid ejected from a nozzle array to an average amount of the liquid ejected from a group including the nozzle array, the smaller a number of times that the liquid is ejected from the nozzle array. Therefore, it is possible to reduce a difference between amounts of the liquid that is ejected from the nozzle arrays and lands on the medium PP per unit area.

In a fourth aspect that is a specific example of any one of the first to third aspects, the liquid ejecting head includes a storage device that stores the plurality of ejection amount identification information pieces, and the acquiring acquires the plurality of ejection amount identification information pieces from the storage device.

According to the fourth aspect, it is possible to acquire the plurality of ejection amount identification information pieces from the storage device of the liquid ejecting head.

In a fifth aspect that is a specific example of any one of the first to third aspects, in the manufacturing method, an imaging device is used, an image indicating the plurality of ejection amount identification information pieces is formed on a wall surface of the liquid ejecting head, and the acquiring acquires the plurality of ejection amount identification information pieces by analyzing imaging information indicating a captured image obtained by capturing the image indicating the plurality of ejection amount identification information pieces by the imaging device.

According to the fifth aspect, it is possible to acquire the plurality of ejection amount identification information pieces and the liquid ejecting head may not include the storage device, as compared with the fourth aspect.

In a sixth aspect that is a specific example of any one of the first to third aspects, in the manufacturing method, a server that stores the plurality of ejection amount identification information pieces is used, and the acquiring acquires the plurality of ejection amount identification information pieces from the server.

According to the sixth aspect, it is possible to acquire the plurality of ejection amount identification information pieces and the image indicating the plurality of ejection amount identification information pieces may not be formed on the wall surface of the liquid ejecting head, as compared with the fifth aspect.

In a seventh aspect that is a specific example of the first aspect, in the manufacturing method, a display device that displays an image is used, the acquiring further acquires first image information indicating a first image in which an image indicating the plurality of groups in the first grouping pattern is superimposed on a head image relating to an image of the liquid ejecting head viewed in a direction in which the liquid is ejected, and second image information indicating a second image in which an image indicating one or more groups in the second grouping pattern is superimposed on the head image, and the selecting selects a single ejection amount identification information piece from among the plurality of ejection identification information pieces after causing the display device to display the first image indicated by the first image information and the second image indicated by the second image information.

According to the seventh aspect, since a manufacturer can select an ejection amount identification information piece while viewing the first image and the second image, the manufacturer can intuitively select the ejection amount identification information piece, and it is possible to reduce a possibility that the manufacturer selects an inappropriate ejection amount identification information piece that is not to be selected by the manufacturer.

What is claimed is:

1. A method of manufacturing a liquid ejecting apparatus including a liquid ejecting head that ejects liquid onto a medium and includes a number N of nozzle arrays that are two or more nozzle arrays and a drive element for ejecting the liquid from nozzles included in the number N of nozzle arrays, and including one or more drive signal generating circuits that generate a drive signal, the method comprising:

acquiring a plurality of ejection amount identification information pieces including a first ejection amount identification information piece corresponding to a first grouping pattern in which the number N of nozzle arrays are grouped into a plurality of groups and a second ejection amount identification information piece corresponding to a second grouping pattern in which the number N of nozzle arrays are grouped into a plurality of groups, the second grouping pattern being different from the first grouping pattern, the first ejection amount identification information piece indicating a relative ratio of an amount of the liquid ejected from each of the nozzle arrays in each of the groups of the first grouping pattern, and the second ejection amount identification information piece indicating a relative ratio of the amount of the liquid ejected from each of the nozzle arrays in each of the groups of the second grouping pattern;

selecting a one ejection amount identification information piece from among the plurality of ejection amount identification information pieces according to a one grouping pattern in which the nozzle arrays are grouped so that the nozzle arrays corresponding to the drive element to which the drive signal generated by each of the one or more drive signal generating circuits is commonly supplied are grouped into the same group; and setting, based on the one ejection amount identification information piece, a number of times that the liquid is ejected from the number N of nozzle arrays onto the medium per unit area.

2. The method of manufacturing the liquid ejecting apparatus according to claim 1, wherein the plurality of ejection amount identification information pieces include ejection amount identification information pieces according to all grouping patterns in which the nozzle arrays are grouped so that the nozzle arrays corresponding to the drive element to which the drive signal generated by each of the one or more drive signal generating circuits is commonly supplied are grouped into the same group, each of the plurality of ejection amount identification information pieces indicates a relative ratio of the amount of the liquid that is ejected from each of the nozzle arrays in each of the groups of a corresponding grouping pattern of the all grouping pattern.

3. The method of manufacturing the liquid ejecting apparatus according to claim 1, wherein one group of groups which are grouped in the one grouping pattern includes a first nozzle array and a second nozzle array, when the one ejection amount identification information piece indicates that a relative ratio of an amount of the liquid ejected from the first nozzle array is higher than a relative ratio of an amount of the liquid ejected from the second nozzle array, a number of times that the liquid is ejected from the first nozzle array onto the medium per unit area is so as to be smaller than a number of times that the liquid is ejected from the second nozzle array onto the medium per unit area.

4. The method of manufacturing the liquid ejecting apparatus according to claim 1, wherein the liquid ejecting head includes a storage device that stores the plurality of ejection amount identification information pieces, and the plurality of ejection amount identification information pieces is acquired from the storage device.

5. The method of manufacturing the liquid ejecting apparatus according to claim 1, wherein an image that is formed on a wall surface of the liquid ejecting head indicates the plurality of ejection amount identification information pieces, and the plurality of ejection amount identification information pieces is acquired by analyzing imaging information indicating a captured image obtained by capturing the image indicating the plurality of ejection amount identification information pieces by an imaging device.

6. The method of manufacturing the liquid ejecting apparatus according to claim 1, wherein the plurality of ejection amount identification information pieces is stored in a server, and the plurality of ejection amount identification information pieces is acquired from the server.

7. The method of manufacturing the liquid ejecting apparatus according to claim 1, wherein a display device that displays an image is used, a first image information is acquired together with the first ejection amount identification information piece, a second image information is acquired a second ejection amount identification information piece, the first image information indicates a first image in which an image indicating the plurality of groups in the first grouping pattern is superimposed on a head image relating to an image of the liquid ejecting head viewed in a direction in which the liquid is ejected, the second image information indicates a second image in which an image indicating one or more groups in the second grouping pattern is superimposed on the head image, and the one ejection amount identification information piece is selected from among the plurality of ejection identification information pieces after causing the display device to display the first image indicated by the first image information and the second image indicated by the second image information.

* * * * *